US 7,437,677 B1

(12) United States Patent
Capps et al.

(10) Patent No.: US 7,437,677 B1
(45) Date of Patent: *Oct. 14, 2008

(54) MULTIPLE PERSONAS FOR ELECTRONIC DEVICES

(75) Inventors: Stephen P. Capps, San Carlos, CA (US); Joseph G. Ansanelli, Palo Alto, CA (US); Ton-Yun Fang, Sunnyvale, CA (US)

(73) Assignee: Apple, Inc., Cupertino, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 11/394,891

(22) Filed: Mar. 30, 2006

Related U.S. Application Data

(63) Continuation of application No. 10/305,678, filed on Nov. 26, 2002, now Pat. No. 7,086,008, which is a continuation of application No. 08/512,021, filed on Aug. 7, 1995, now Pat. No. 6,512,525.

(51) Int. Cl.
G06F 17/60 (2006.01)
G06F 15/00 (2006.01)

(52) U.S. Cl. ...................... 715/762; 715/853

(58) Field of Classification Search ............... 715/762, 715/808, 751, 853, 759, 744, 776
See application file for complete search history.

(56) References Cited

U.S. PATENT DOCUMENTS

| 5,199,104 A | 3/1993 | Hirayama |
| 5,228,123 A | 7/1993 | Heckel |
| 5,345,543 A | 9/1994 | Capps et al. |
| 5,367,453 A | 11/1994 | Capps et al. |
| 5,588,105 A * | 12/1996 | Foster et al. ............... 715/779 |
| 5,590,038 A * | 12/1996 | Pitroda ........................ 705/41 |
| 6,512,525 B1 | 1/2003 | Capps et al. |

OTHER PUBLICATIONS

O'Connor, Rory J., "Apple Banking on Newton's Brain," Apr. 22, 1992, San Jose Mercury News.
Weiman, Liza and Moran, Tom, "A Step Toward the Future," Aug. 1992, Macworld Magazine.
Soviero, Marcelle M., "Your World According to Newton," Sep. 1992, Popular Science Magazine.
Abatemarco, Fred, "From the Editor," Sep. 1992, Popular Science Magazine.
Cohen, Raines, "Slimmed-Down Message Pad to Beef up RAM Recogntion," Feb. 14, 1994, MacWeek, vol. 8, No. 7, pp. 1 and 84.
Robert Carr, The Power of Penpoint, 1991, Chapter 2, pp. 26-29.

* cited by examiner

Primary Examiner—Cao Nguyen
(74) Attorney, Agent, or Firm—Beyer Law Group LLP

(57) ABSTRACT

A computer system is disclosed which may adopt one of many personas, depending upon the role that its owner is currently playing. The computer system includes a central repository of extensible personas available to all applications running on the computer system. Each such persona has associated therewith a suite of parameters, or specific values for parameters, which are appropriate for conducting computer implemented transactions under a particular persona. The computer system further includes a graphical user interface which allows the user to switch from persona to persona by selecting a particular persona from a list of available personas displayed on a display screen of the computer system. By selecting such persona, the user causes the computer system to globally change the entire suite of parameter values so that subsequent transactions conducted with the computer system employ the parameter values of the current persona.

19 Claims, 29 Drawing Sheets

MULTIPLE PERSONAS FOR ELECTRONIC DEVICES

CROSS-REFERENCE TO RELATED APPLICATIONS

This application is a Continuation of U.S. patent application Ser. No. 10/305,678, filed Nov. 26, 2002 now U.S. Pat. No. 7,086,008, entitled "MULTIPLE PERSONAS FOR MOBILE DEVICES," which is hereby incorporated by reference herein, which is a Continuation of U.S. patent application Ser. No. 08/512,021, filed Aug. 7, 1995, entitled "MULTIPLE PERSONAS FOR MOBILE DEVICES," now U.S. Pat. No. 6,512,525, and which is hereby incorporated by reference herein.

BACKGROUND OF THE INVENTION

The present invention relates generally to computer systems, and more particularly to systems for adjusting collections of parameters used in conducting transactions in computer systems.

Computers are becoming increasingly powerful, lightweight, and portable. The computing power of computers that once filled entire rooms is now residing on a desktop. Laptop, notebook, and sub-notebook computers are virtually as powerful as their desktop counterparts. Even smaller hand-held computers are now capable of computing tasks that required much larger machines a few short years ago.

As a part of this trend, computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from many companies including Sharp and Casio of Japan.

A relatively new form of computer, the pen-based computer system, holds forth the promise of a marriage of the power of a general purpose computer with the functionality and small size of a personal organizer. An example of a pen-based computer system is the Newton® 120 pen-based computer made and marketed by Apple Computer, Inc. of Cupertino, Calif.

A pen-based computer system is typically a small, hand-held computer where the primary method for inputting data includes a "pen" or stylus. A pen-based computer system is commonly housed in a generally rectangular enclosure, and is provided with a dual-function display assembly that can serve as both an input device and an output device. When operating as an input device or "tablet", the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad, among other functions. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. By "ink" it is meant that pixels on the screen are activated in such a manner that it appears that the stylus is leaving a trail of ink on the display assembly. With suitable recognition software, the "ink" can be recognized to input text, numerics, graphics, and other recognized information into the pen-based system.

Because pen-based computer systems are portable and easy to use, owners often use them in various locations and for various types of tasks. In essence, the pen-based computer system becomes an "agent" of its owner, performing for the owner various routine tasks such as faxing, note taking, e-mailing, etc. Frequently the owner takes on various roles or "personas" such as, for example, private citizen, professional employee, volunteer, hobbyist, etc.

A difficulty arises in this context because entirely different sets of parameters (used by the pen-based computer system to perform its tasks) may be associated with each of these various personas. It can be cumbersome for the agent pen-based computer system to seamlessly adapt to these various roles. For example, various of the personas may have associated therewith separate addresses, phone numbers, credit card numbers, etc. Often these various pieces of information must be separately specified for such activities as automatically generating correspondence, sending a facsimile, or purchasing items. Specifically, to charge a facsimile transmission from a pen-based computer system, the computer system owner might use one phone card number (for a business line) when adopting a professional persona and a different phone card number (for a home line) when adopting a private citizen persona. The situation may be further complicated because a given pen-based computer system might be used by its owner's family members or other colleagues from time-to-time. Each of these other users have their own personas.

Some desktop and laptop computer systems such as the Macintosh® available from Apple Computer, Incorporated of Cupertino Calif., have provided the ability to quickly switch between collections of parameters associated with different "worksites". For example, one worksite may be associated with a principle business office at which a desktop computer sits, and second worksite might be at a company's branch office. Each of these worksites likely uses a different printer and has a different phone number. Some applications have been proposed for use on the Apple Macintosh® that would have allowed users to switch between various "worksites settings" depending upon where the computer was used. In this manner, printer settings, phone numbers and an entire suite of parameters associated with a given worksite could be changed very easily. Unfortunately, these worksite-specific parameters are sometimes not useful in situations where a user is changing personas. In fact, a user may often change personas in the course of a short period of time, without ever changing a worksite.

Therefore, it would be desirable to provide some method for quickly and easily changing an entire collection of parameters of relevance to the pen-based computer system when its owner adopts different personas.

SUMMARY OF THE INVENTION

The present invention provides computer systems which may adopt one of a plurality of personas. The invention can be implemented in numerous ways, including as a method, system, device, apparatus (including graphical user interface), or computer readable medium. Several embodiments of the invention are discussed below.

As a method implemented on an electronic device having a display screen, one embodiment of the invention includes at least: identifying a transaction specified by a user via a graphical user interface of the electronic device, the transaction requiring, in order to be performed, that values of a collection of parameters be specified; determining a current persona for the electronic device, the persona being one of multiple personas available on the electronic device and for use by one or more users of the electronic device, each of the personas having an associated set of values for persona parameters, at least some of the persona parameters being within the collection of parameters required to perform the transaction; and performing the specified transaction with the persona parameters for the current persona. The electronic device is, for example, a computing device.

As a computer capable of adopting multiple personas, one embodiment of the invention includes at least: a CPU; a memory in communication with the CPU; a display screen in communication with the CPU; encoded instructions stored in the memory for specifying two or more personas corresponding to capabilities for operating the computer for use by a user, each of the personas specifying a unique set of persona parameters; and encoded instructions stored in the memory for switching between the two or more personas, wherein when the computer is associated with a current persona, transactions performed with the computer employ the set of persona parameters associated with that current persona.

As a computer readable medium containing program instructions, one embodiment of the invention includes at least: identifying a task specified by a user via a graphical user interface of a electronic device, the task requiring, in order to be performed, that values of a collection of parameters be specified; determining a current persona for the electronic device, the persona being one of multiple personas available on the electronic device and for use by one or more users of the electronic device, each of the personas having an associated set of values for persona parameters, at least some of the persona parameters being within the collection of parameters required to perform the task; and performing the specified task with the persona parameters for the current persona.

As a computer readable medium containing program instructions, another embodiment of the invention includes at least: determining a current persona from a plurality of personas for a computing device; and thereafter operating the computing device in accordance with the current persona.

As a computer readable medium containing program instructions, still another embodiment of the invention includes at least: identifying a transaction specified by a user via a graphical user interface presented on a display screen of electronic device; determining a current persona for the electronic device, the current persona being one of a plurality of personas available for use with the electronic device, each of the personas having corresponding persona parameters; and performing the specified transaction with at least one of the persona parameters for the current persona.

These and other features and advantages of the present invention will become apparent upon reading the following detailed descriptions and studying the various figures of the drawings.

BRIEF DESCRIPTION OF THE DRAWINGS

FIG. 15b is a screen shot showing a "e-mail" routing slip as in the form shown in FIG. 15a;

FIG. 15d is a screen shot showing a "fax" routing slip as in FIG. 15a;

DETAILED DESCRIPTION OF THE PREFERRED EMBODIMENTS PEN-BASED COMPUTER SYSTEMS

The present invention is well suited for pointer based computer systems such as the pen-based, pen-aware, mouse, track ball, and track pad controlled systems that are currently popular. For the purposes of illustration, the invention will be described in connection with a pen-based system.

Figure 1:
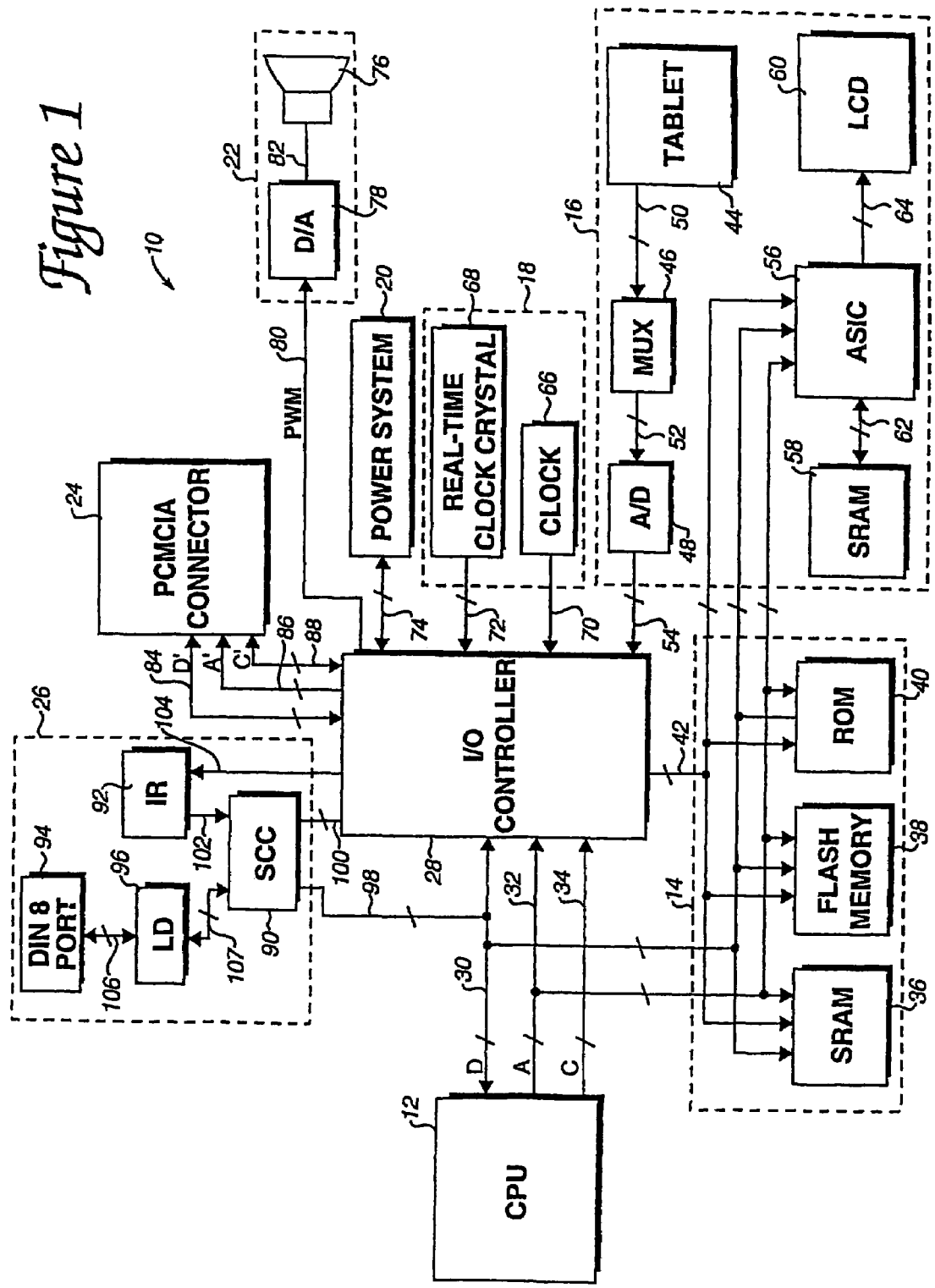
FIG. 1 is a block diagram of the electronics of a pen-based computer system in accordance with the present invention.

As shown in FIG. 1, a block diagram 10 of the electronics of a pen-based computer in accordance with the present invention includes a central processing unit (CPU) 12, a memory system 14, an input/output (I/O) dual function display system 16, a clock system 18, a power system 20, a sound system 22, a PCMCIA connector 24, and a serial I/O system 26. The various components and systems of the computer 10 are coupled together by an I/O controller 28 which serves as an interface between the CPU 12 and other components of the computer 10. More specifically, the I/O controller 28 is an application-specific integrated circuit (ASIC) designed to handle memory, peripherals, and I/O tasks, as well as housekeeping functions such as providing system clocks, controlling power usage, etc. The design, manufacture, and use of ASICs is well known to those skilled in the art. The pen-based computer 10 as illustrated is currently being manufactured and sold by Apple Computer, Inc. of Cupertino, Calif. as a Newton® 120 Personal Digital Assistant (PDA).

CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. In the present embodiment, the CPU 12 is preferably an ARM® 610 RISC chip operating at 20 megahertz and is available from a variety of sources including VLSI Technology, Inc. of San Jose, Calif. and Plessey Semiconductor of England. The present CPU 12 includes a 32 bit data (D) bus 30, a 32 bit address (A) bus 32, and an 8 bit control (C) bus 34.

The memory system 14 includes static random access memory (SRAM) 36, non-volatile read/write "flash" memory 38, and read-only memory (ROM) 40. The SRAM 36 serves as volatile "scratch pad" memory for the computer system 10 and, in the current system, includes 512 kilobytes of memory. The flash memory 38 is where user data is stored, preferably includes about 2 megabytes of memory, and is available as a standard product from Intel Corporation of Santa Clara, Calif. The ROM 40 stores the operating system and embedded application programs, and currently comprises approximately 8 megabytes of memory. Of course, there are many equivalents for the SRAM 36, flash memory 38, and ROM 40. For example, dynamic random access memory (DRAM) can be substituted for SRAM 36, battery-backed random accessed memory (RAM) can be substituted for flash memory 38, and a programmable read-only memory (PROM) can be substituted for the ROM 40.

The memory system 14 is coupled directly to the data (D) bus 30 and the address (A) bus 32. The memory system 14 is also coupled to a memory control bus 42 of controller 28. The CPU 12 and controller 28 cooperate to read and write data to the memory system 14 via the busses 30, 32, and 42.

The display system 16 serves as both an input device and an output device. More particularly, a tablet 44, multiplexer (MUX) 46, and analog-to-digital (A/D) converter 48 convert the contact of a stylus (see FIG. 2) with the tablet 44 and its subsequent movement over the tablet into digital data that is input to the controller 28. The tablet 44 is preferably a four-wire resistive membrane tablet and provides positional information on a bus 50 which is input into the MUX 46. The MUX 46 determines which of the four sides of the tablet is to be read. Such tablets are widely available from a variety of sources including Nissha of Japan. An output from the MUX 46 is input to A/D converter 48 on a bus 52. An output from the A/D converter 48 is input into the controller 28.

The display system 16 further includes an ASIC 56, a dedicated SRAM 58, and an LCD screen 60. The ASIC 56 is an LCD controller coupled to the data (D) bus 30, the address (A) bus 32, and the memory control bus 42. The purpose of the ASIC 56 is to allow the CPU 12 to write to the screen as if it were a RAM sitting on the memory bus 42. The SRAM 58 is coupled to the ASIC 56 by a dedicated bus 62, and the screen 60 is coupled to the ASIC 56 by a dedicated bus 64. The ASIC 56 serves as a controller for the screen 60, and uses the SRAM 58 as a frame buffer to store images to be displayed on the screen 60. The LCD screen 60 is preferably a standard super-twist LCD matrix screen available from a number of sources including Seiko-Epson of Japan. The LCD screen preferably comprises a rectangular array of picture elements or "pixels", as is well known to those skilled in the art.

The clock system 18 includes a main system clock 66 and a real-time clock (RTC) crystal 68. The main system clock is a four-terminal oscillator and is used to provide the master clock for the computer 10. In the present embodiment, the main system clock 66 operates at 40 megahertz. Oscillator clocks such as clock 66 can be commercially obtained from many sources including Seiko-Epson of Japan. This master clock may be divided down by the controller 28 for various timing purposes in the system, and is coupled to the controller 28 by a line 70.

The RTC crystal 68 is tuned to 32.768 kilohertz, which is evenly divisible by a power of 2. The RTC crystal 68 forms the basis of a crystal based oscillator that can provide a continuous, precise, uninterrupted signal at 1 hertz by dividing down the 32.768 kilohertz crystal signal with a 10 bit divider. The circuitry for performing this type of task is well-known, and form a part of controller 28 in this embodiment. The one hertz RTC signal increments a RTC counter (also a part of the controller 28) to count of the total number of seconds that has elapsed since midnight, Jan. 1, 1904 (an arbitrary start time). The value in the RTC counter can be converted into time of day and date information by relatively straight-forward calculations well known to those skilled in the art. Since the RTC crystal 68 is coupled to the controller 28 by a dedicated two-line bus 72 to provide the 32.768 kilohertz signal to the controller 28.

The power system 20 provides power to the computer 10 and is coupled to the controller 28 by a dedicated bi-directional bus 74. The bus 74 allows for the handling of fault detection signals (e.g. low power), switching on and off power to the PCMCIA connector, etc. The power system 20 preferably controls the power system 20 to conserve power at times of low usage of the pen-based computer system.

The sound system 22 includes a small (18 mm diameter) loudspeaker 76 and a D/A converter 78. The D/A converter 78 is coupled to the controller 28 by a line 80, and to the loudspeaker 76 by a line 82. In the present embodiment, the D/A converter 78 is a simple operational amplifier (OP AMP) which acts as an integrator to integrate pulse width modulation (PWM) signals developed on line 80 to provide an analog signal on line 82 to drive loudspeaker 76. Of course, more complex D/A converters can also be used to provide higher quality sound output from loudspeaker 76, as will be apparent to those skilled in the art. Suitable OP AMPS to be used as a D/A converter 78 are readily available on the commercial market, and the miniature loudspeaker is also readily available, such as from Hosiden of Osaka, Japan.

The PCMCIA connector 24 is coupled to the controller 28 by a dedicated data (D') bus 84, a dedicated address (A') bus 86, and a dedicated control (C') bus 88. The PCMCIA specifications for signals on the dedicated data, address, and control busses are industry standard and highly available as the "PC Card" or "PCMCIA" standard. A variety of devices can fit in the PCMCIA slot 24, including memory expansion cards, miniature hard disk drive cards, modem cards, and pager cards, to name a few.

The serial I/O system 26 includes a Serial Communications Controller (SCC) 90, an infrared (IR) transceiver 92, a serial port 94, and a line driver (LD) 96. The SCC 90 is coupled to the data bus (D) 30 by a bus 98 and to the controller 28 by a bus 100. A suitable SCC 90 can be purchased from Zilog Corporation of San Jose, Calif. as part number Z85C30. The Zilog Z85C30 has been available since at least the early 1980's and supports a number of serial protocols. The IR transceiver 92 is coupled to the SCC 90 by a line 102 for received IR signals, and to the controller 28 for IR signals to be transmitted. The IR transceiver includes an IR transmitter (coupled to line 104) and an IR receiver (coupled to line 102), and is available under license from Sharp Corporation of Japan. The IR receiver includes a PIN-type IR-sensitive diode having an output coupled to an analog demodulator and an amplifier to create a signal on line 102, an IR LED coupled to line 104 to be directly driven by a high-power switch of controller 28. The serial port 94 is a standard DIN 8 (8 pin) connector, and is coupled to the line driver LD 96 by an eight bit bus 106. The LD 96 is coupled to the SCC 90 by a bus 107.

Figure 2:
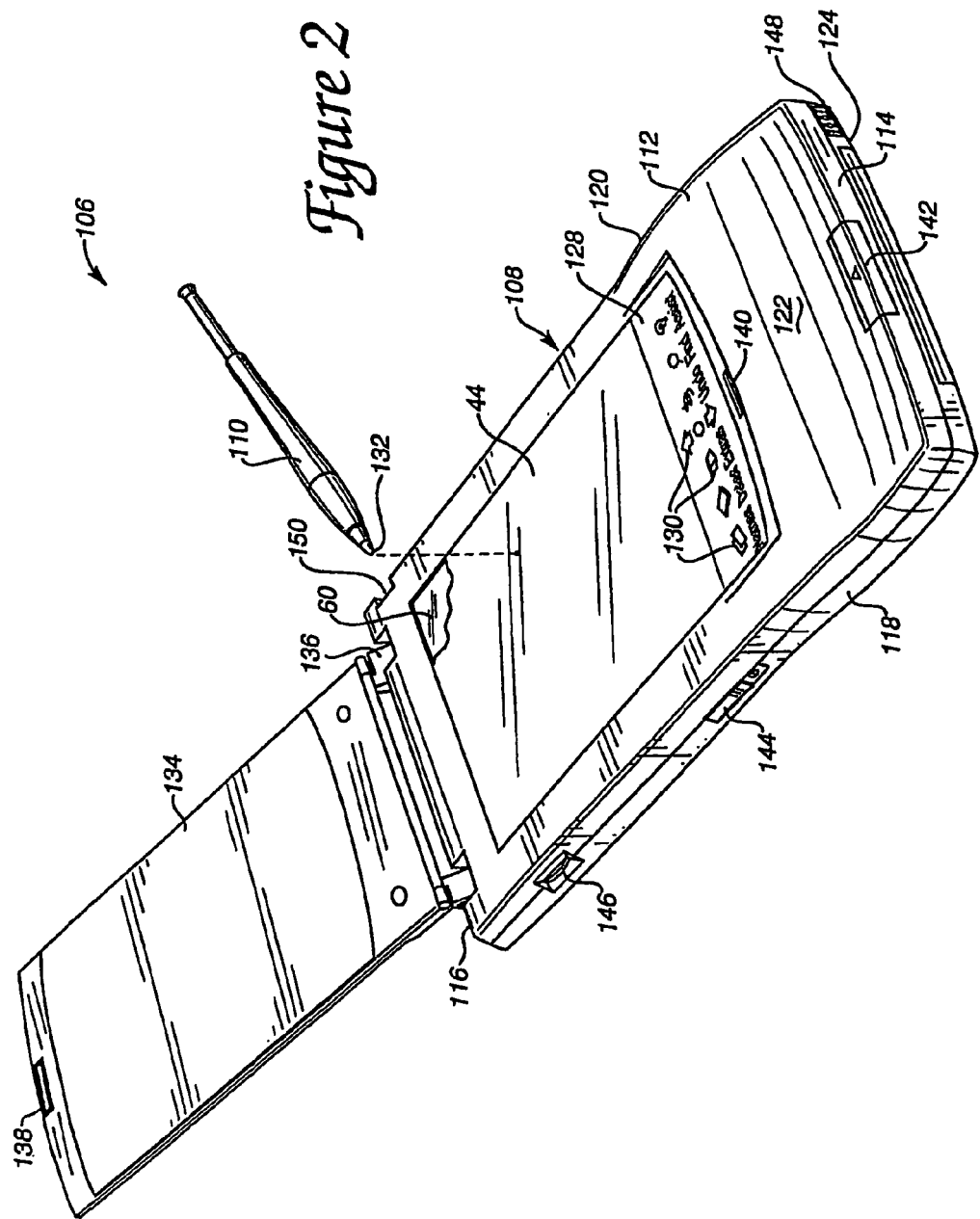
FIG. 2 is a perspective view of a complete pen-based computer system including a housing, display assembly, and stylus, where the electronics of FIG. 1 are enclosed within the housing.

Referring now to FIG. 2, a pen-based computer system 106 in accordance with the present invention includes the computer 108 and a pen or stylus 110. The computer 108 is enclosed within a generally flat, rectangular case 112 having a front end 114, a back end 116, a left side 118, a right side 120, a top 122, and a bottom 124. The LCD 60 is positioned along the top 122 of the case 112, and the clear membrane tablet 44 is positioned over the LCD 60. Also positioned beneath the tablet 44 along a lower edge 126 thereof, is a printed strip of material 128 including a number of indicia 130. When the tip 132 of the stylus 110 is engaged with the membrane 44 over one of the indicia 130, the computer 108 can respond to the contact as if the engaged indicia was a "button." Therefore, as used herein, a "button" can be an image seen through the tablet 44 (either from the screen 60 or from printed material 128 or the like) that can serve the function of an electro-mechanical button or the like when the tablet 44 is activated over a button image.

A lid 134 is connected to the back end 116 of case 112 by hinge 136. When open as shown or folded back to contact the bottom 124 of case 112, the tablet 44 and screen 60 are available for use. When the cover 134 is folded over the top 122 of case 112, it fully covers the tablet 44 to protect the delicate membrane material. The lid 134 is provided with a latch member 138 which engages a latch member 140 when it is overlying the top 122 of the computer. The latch member 138 is disengaged from the latch member 140 by a mechanical latch release 142.

Also seen in FIG. 2 is an "on" switch 144, a contrast adjustment 146, and a grille 148 for the speaker 76. The stylus 110 is of a collapsible design and can fit into an opening 150 along the right side 120 of case 112. Not seen in this figure along the right side 120 of the case 112 is an opening for a PCMCIA card which can engage PCMCIA connector 24, the DIN 8 port 94, and a power input jack. Not seen along the bottom 124 of the case 112 is a battery access cover and a mechanical ejection button for a PCMCIA card engaged with the PCMCIA connector 24. The IR port 92 is provided along back 116 of the case 112 and is exposed for use when the cover 134 is folded against the bottom 124 of the case 112. The remaining components and systems of the computer block diagram 10 of FIG. 1 are enclosed within the case 112 of the computer system 108.

It should be noted that the preceding discussion is of a preferred embodiment of the present invention, and that there are many alternatives for the stylus 110. For example, a fingernail or other pointed object could be used with the tablet 44 of the present invention. Also, there are other types of tablets available that utilize other types of styluses.

Other types of pointing devices can also be used in conjunction with the present invention. While the method of the present invention is described in the context of a pen-based system, other pointing devices such as a computer mouse, a track ball, a track pad, a tablet, etc. can be used to manipulate a pointer on a screen of a general purpose computer. Therefore, as used herein, the terms "pointer", "pointing device", "pointing apparatus", "pointing means", and the like will refer to any mechanism, device, or system for designating to a particular location on a screen of a computer display.

Figure 3:
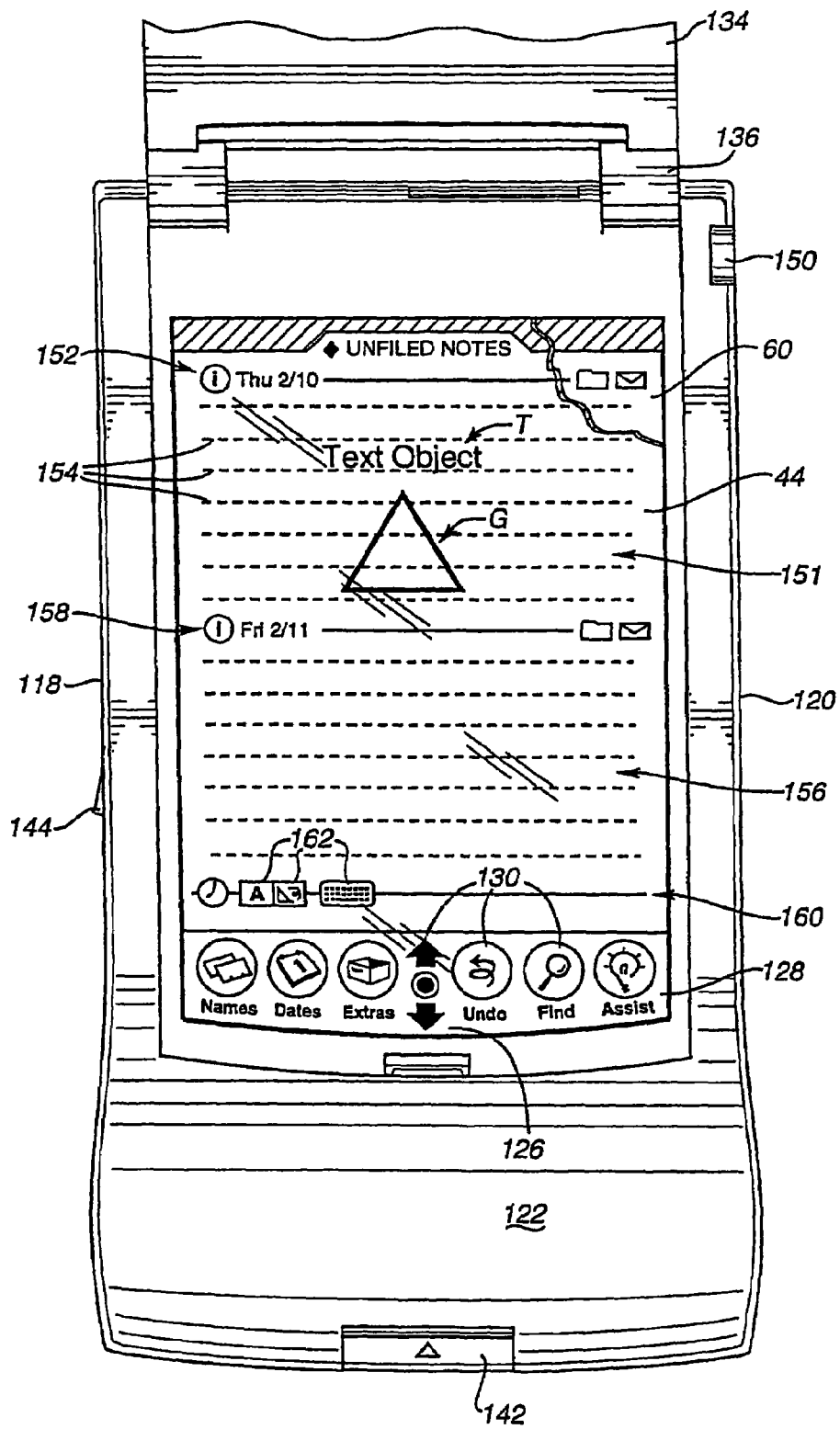
FIG. 3 is a top plan view of the housing and display assembly of pen-based computer system of FIG. 2.

With additional reference to FIG. 3, information is input into the pen-based computer system by "writing" on the tablet 44 with stylus 110 or the like. Information concerning the location of the tip 132 of stylus 110 on the tablet 44 of the display system 16 is input into the CPU 12 via the controller 28. Typically, this information comprises the Cartesian (i.e. x & y) coordinates of a pixel of the screen 60 over which the tip 132 of the stylus 110 is positioned. The CPU 12 then processes the data under control of an operating system (stored in ROM 40) and possibly an application program stored in the memory system 14 or elsewhere (such as on a PCMCIA card engaged with PCMCIA connector 24). The CPU 12 next produces data which is transferred to the screen 60 via ASIC 56 to produce appropriate images on the screen.

Upon power-up, pen-based computer system 106 displays on screen 60 an initial "note" area 151 including a header bar 152 and a number of guidelines 154. The header bar 152 preferably includes the date of creation of the note area 151 and a number of icons and "soft" buttons, not particularly germane to the discussion of the present invention. The guidelines 154 aid a user in entering text, graphics, and data into the pen-based computer system 106. A text object T of the text "Text Object" and a graphic object G of a triangle are shown as being entered within note area 151.

Additional note areas, such as a second note area 156, can be formed by the user by drawing a substantially horizontal line across the tablet 44 with the stylus 110. The substantially horizontal line is recognized by the computer system 106 and is converted into a second header bar 158. Additional text, graphical, and other data can then be entered into this second note area 156.

The screen illustrated in FIG. 3 is referred to as the "notepad", and is preferably an application program running under the operating system of the pen-based computer system 10. In this preferred embodiment, the notepad is a special or "base" application which is usually or normally available beneath higher level applications. The notepad application, like other applications, run within a window, which in this instance comprises the entire screen 60. Therefore, as used herein, a "window" is the entire screen or any portion of an entire screen which is dedicated to a particular application program. A description of the operation and use of the notepad can be found in U.S. Pat. No. 5,398,310, assigned to the assignee of the present invention, and incorporated herein by reference.

A status bar 160 is provided at the bottom of the notepad application. The status bar 160 is provided with a number of active areas and a number of display areas, which again are not particularly germane to the present invention and will therefore not be discussed in detail herein.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, "Object Oriented Programming for the Macintosh," by Kurt J. Schmucher, Hayden Book Company, 1986.

In the present invention, objects may be implemented as part of a frame system that comprises frame objects related by a semantic network. A description of semantic networks can be found in "A Fundamental Tradeoff in Knowledge Representation and Reasoning," Readings in Knowledge Representation, by Brachman and Leveseque, Morgan Kaufman, San Mateo, 1985.

It will be noted there is a liberal use of graphic elements in the present invention. For example, the header bars 152 and 158 include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book "Inside Macintosh, Volumes I, II, and III," by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 60 can form a first or "root" layer, with the status bar 160, for example, positioned in a second layer "over" the root layer. The various buttons 162 of the status bar 160 are positioned in a third layer "over" the second and root layers. The view system automatically handles "taps" and other gestures of the stylus 110 on the screen 60 by returning information concerning the tap or gesture and any object to which it may be related. U.S. patent application Ser. No. 07/976,970 filed Nov. 16, 1992 on behalf of Foster et. al, entitled "Status Bar for Application Windows" and assigned to the assignee of the present invention describes a preferred view system and how to make and use the status bar, and is incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

Records of Machine Personas

Figure 4A:
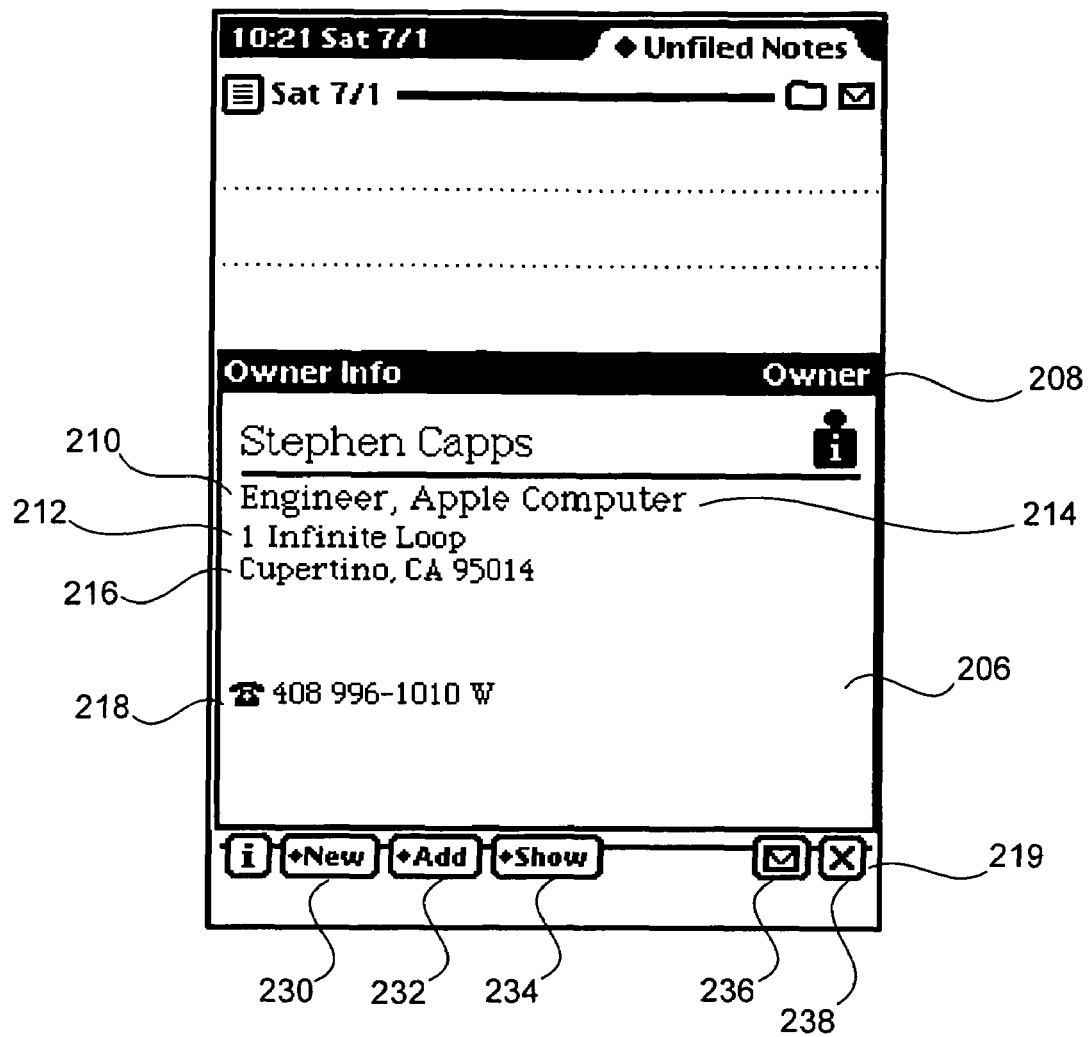
FIG. 4a is a screen shot of an ownership record for an individual who has adopted the persona of a professional engineer.
Figure 4B:
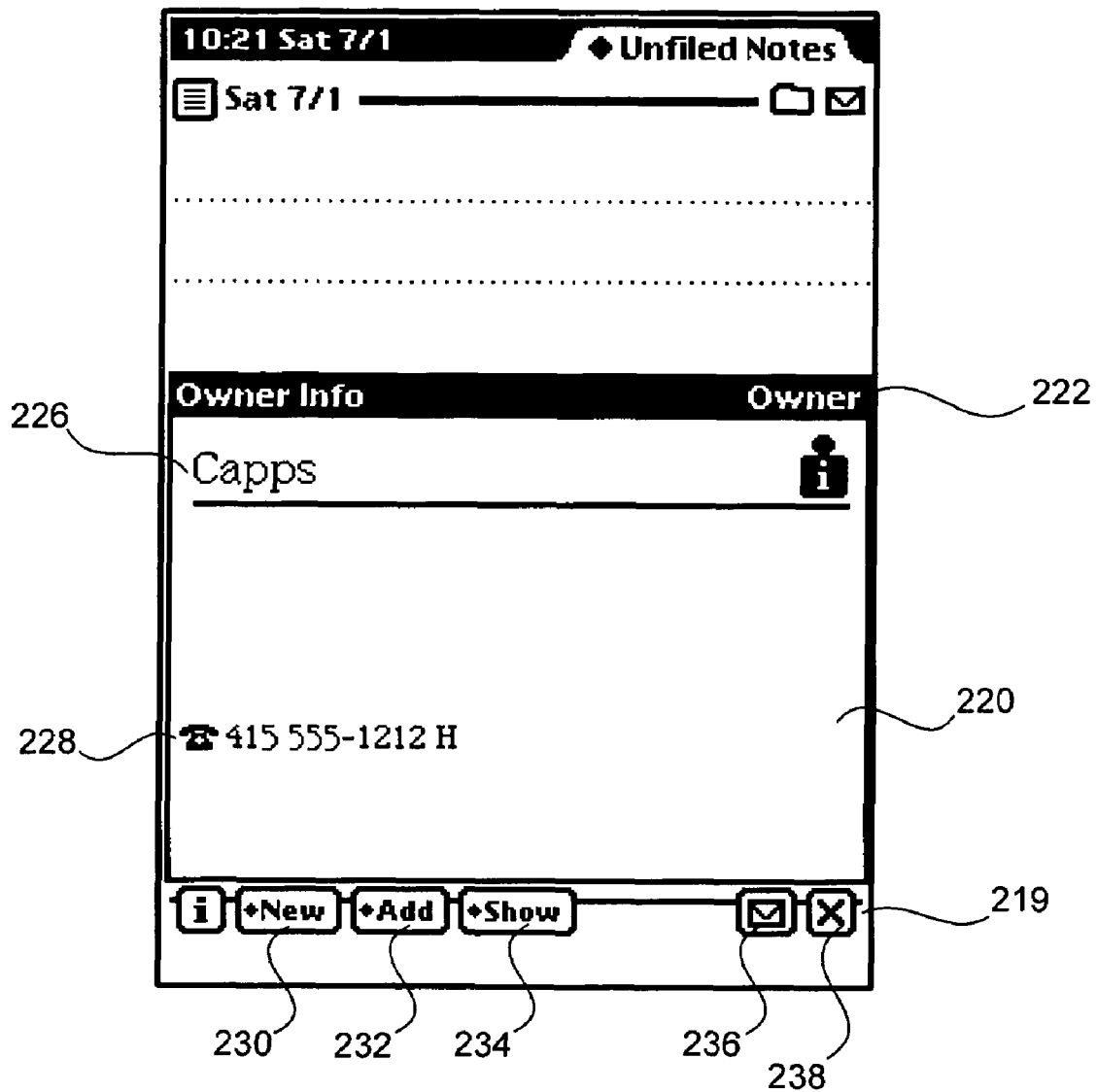
FIG. 4b is ownership record for the same individual as in FIG. 4a, but in which the persona is that of a private citizen.

FIGS. 4a and 4b illustrate the multiple persona that may be adopted by a computer system in accordance in this invention. FIGS. 4a and 4b are screen shots illustrating how records containing the information associated with the various persona of a human individual may be displayed on display screen 60. As noted, owners of hand-held computers may adopt multiple personas such as private citizen, professional employee, volunteer, hobbyist, etc.

In the example presented in FIGS. 4a and 4b, the hand-held machine is shown to have two personas. In the case of FIG. 4a, the persona is Stephen Capps, professional engineer, while the persona illustrated in FIG. 4b is provided in for Stephen Capps, private citizen. As shown in FIG. 4a, some information associated with Stephen Capps, professional engineer, includes his company affiliation, title in the company, company address, and company phone number. In contrast, his private citizen persona is shown to include his home phone number, and may include such other information as a home address, etc.

The information provided in the various personas may be employed to execute various transactions associated with the hand-held computer system 106. For example, when the hand-held machine has adopted the persona of Stephen Capps, professional engineer, (FIG. 4a), it may automatically generate facsimile cover sheets or letterhead having Stephen Capp's title, company, company phone number, and company address. In contrast, correspondence generated when the hand-held machine has adopted the persona of Capps, private citizen, would have the name and phone number shown in FIG. 4b.

The information associated with a particular persona may displayed in an "ownership record" 206 as shown in FIG. 4a. Such ownership record may have an ownership record heading 208 as well as specified values for some parameters associated with the particular persona of the ownership record. In the example of FIG. 4a, the ownership recorded 206 includes fields for the following information: a name 210, a title 212, a company affiliation 214, an address 216, and a telephone number 218, all associated with the same persona. Of course, each persona associated with the same individual has its own ownership record as illustrated by ownership record 220 for Stephen Capps, private citizen, shown in FIG. 4b. As before, the ownership record 220 includes a consistent format including an ownership record heading 222 and various fields for persona parameters, including the name Capps at field 226 and the telephone number at field 228.

In a preferred embodiment, the ownership records are provided as a convenient central repository of the parameters associated with each persona used by the hand-held computer and available to all applications provided on the hand-held computer. Changes to a given persona can be made by opening the ownership record for that persona and modifying or adding parameters as necessary. The ownership records are accessible via a special "names" application (which acts as a type of electronic card file) and are provided in the computer system in the same manner as other name records. Such applications are described in U.S. patent application Ser. No. 07/955,839 filed Oct. 2, 1992, naming Capps, et al. as inventors, and entitled INTERFACE FOR A COMPUTERIZED DATABASE HAVING CARD AND LIST VIEWS, now U.S. Pat. No. 5,446,882. That document is incorporated herein by reference for all purposes.

To facilitate display, modification, and use of the ownership records, controls 219 may be provided at the bottom of all ownership records. Within this collection of control buttons, is a "new" button 230 which when tapped by a user presents a new ownership record which is displayed on display screen 60. This new record corresponds to a new persona available on the hand-held computer system. The controls 219 also include an "add" button 232 which, when selected, displays a list of available parameters that can be either modified or newly incorporated into a given ownership record as explained in more detail below (in connection with FIG. 7). In addition, a "show" button 234 will display the ownership record in an alternate format (e.g., as a linear list instead of as a business card) when selected by a user. Finally, a routing action button 236 provides a list of routing actions, such as faxing, mailing, etc. when selected, and close button 238 closes the displayed owner information window 206 when selected.

In preferred embodiments the various control buttons 219 are selected by tapping on them with a stylus. In addition, the various fields of the ownership records can be modified by handwritten editing or type keystrokes made on a simulated keyboard displayed on the display screen 60.

Figure 5:
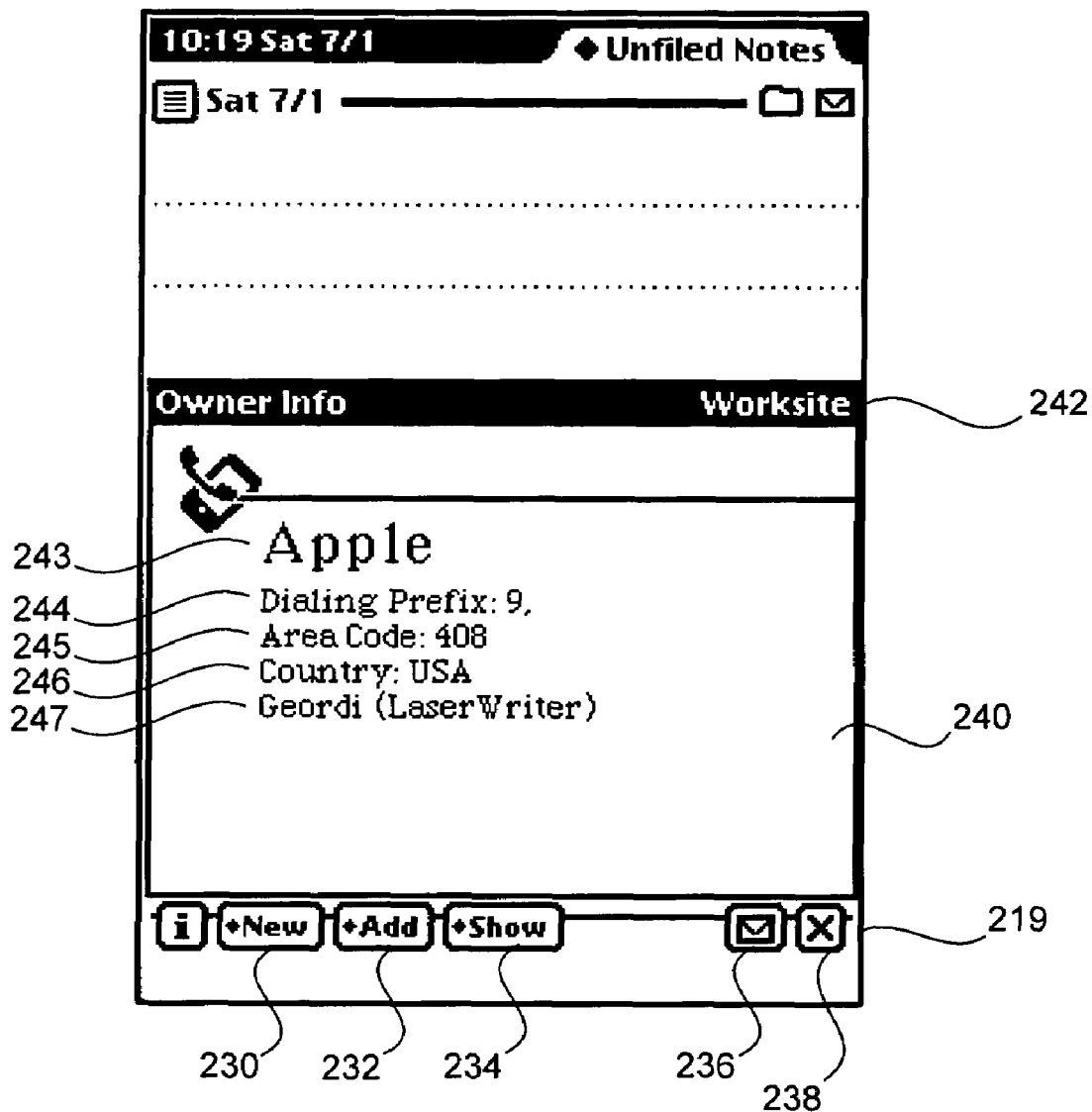
FIG. 5 is a screen shot of a worksite record providing information for a corporate worksite.
Figure 6:
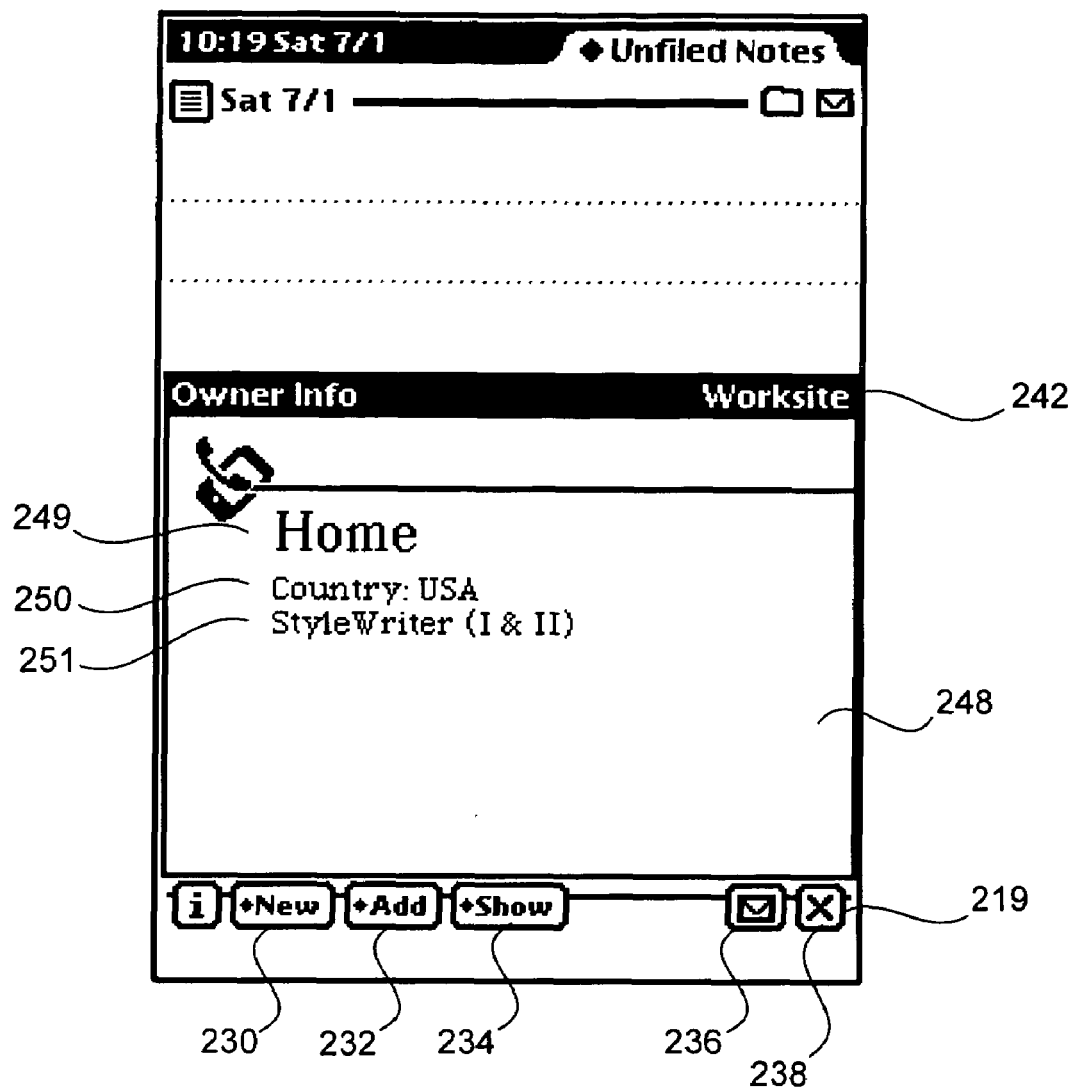
FIG. 6 is a screen shot of a worksite record for a home location.
Figure 7:
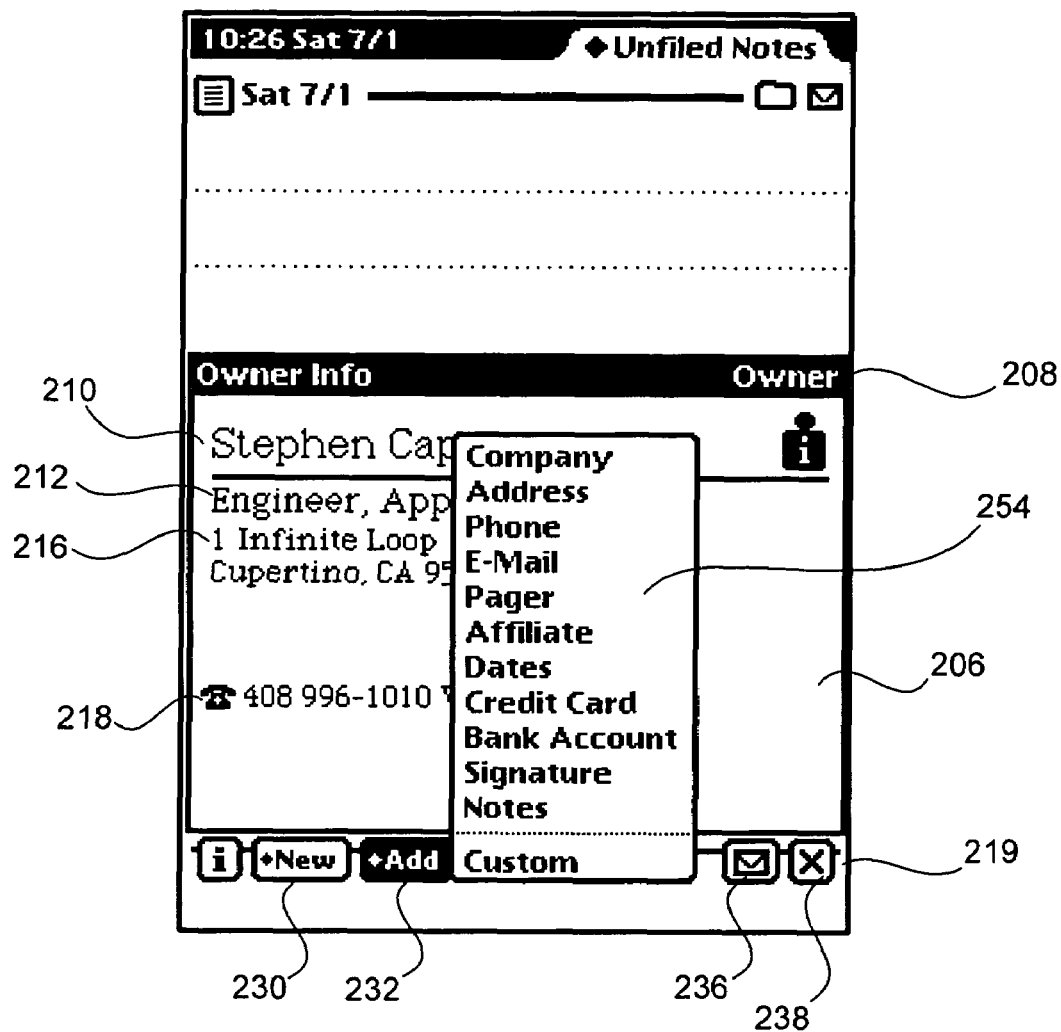
FIG. 7 is a screen shot illustrating a pop-up menu for selecting certain parameters associated with a given persona as represented in an ownership record.

In parallel with the various persona records provided with the present invention, various worksite records may also provided. For example, as shown FIGS. 5 and 6, the hand-held computer may include worksite records associated with a company (in FIG. 5), and a home (FIG. 6). Preferably, a worksite record 240 as shown in FIG. 5 includes a worksite record heading 242, a collection of control buttons 219, (identical to those control buttons shown in FIGS. 4a and 4b), and various fields for specified parameters. For example, a worksite name 243 is provided as a company name within company worksite record 240. In addition, a dialing prefix parameter 244 specifies a telephone dialing prefix, if any, that is required to dial telephone numbers outside of the worksite. Further, an area code parameter 245 provides the telephone area code associated with the worksite. Next, a country field 246 specifies the country associated with the given worksite record. Finally, a printer field 247 indicates the given printer by type and name associated with the specified worksite. As shown in FIG. 7, a different worksite record 248 may include its own worksite name 249, country field 250, and printer field 251. As before, the worksite record 248 includes a worksite heading 242 and a collection of control buttons 219.

As may be apparent, when a user switches between various persona or worksite settings, the computer system automatically changes all the persona or worksite related parameters so that the user is not troubled by having to make such changes.

Preferably, all ownership and worksite records are stored within the hand-held computer in such a manner that they are available to all applications which may run on the computer. As noted, the computer user may enter any number of parameters associated with his or her various personas. This may be accomplished by selecting the "add" button 232 as shown in FIG. 7. This causes to be displayed a pop-up menu 254 having a list of selectable parameters. Thereafter, if the user selects any of the listed parameters, he or she is given the option of adding specific values for a selected parameter.

As shown, the menu 254 provides as default parameters a persona's company, address, phone number, e-mail number, affiliate, dates, credit card number, bank account number, signature, and notes. In addition, at the bottom of menu 254, an entry is provided for a "custom" parameter setting. When a user selects any one of the parameters listed in menu 254, he or she will be given the opportunity, in the form of a newly displayed dialog box, to add or change the settings associated with that parameter. For example, by selecting the signature parameter, the user could enter his or her signature which might be automatically added to various documents sent by the user. Similarly, by selecting the credit card parameter, the user could enter a business credit card number and expiration date which could then be used to charge certain business purchases through transactions initiated with the pen-based computer system.

It should be understood that the multiple personas provided in the computer system are extensible. That is, they can have additional parameter values added as appropriate for any new application. For example, suppose that a developer provides a new pizza ordering application. For one persona, such as a boy scout leader persona, multiple pizzas of various types are always ordered, while for a different persona, such as the private citizen persona, only a single pizza is ordered. The personas of the computer system could be extended to include this pizza ordering information to accommodate the new application.

Figure 8A:
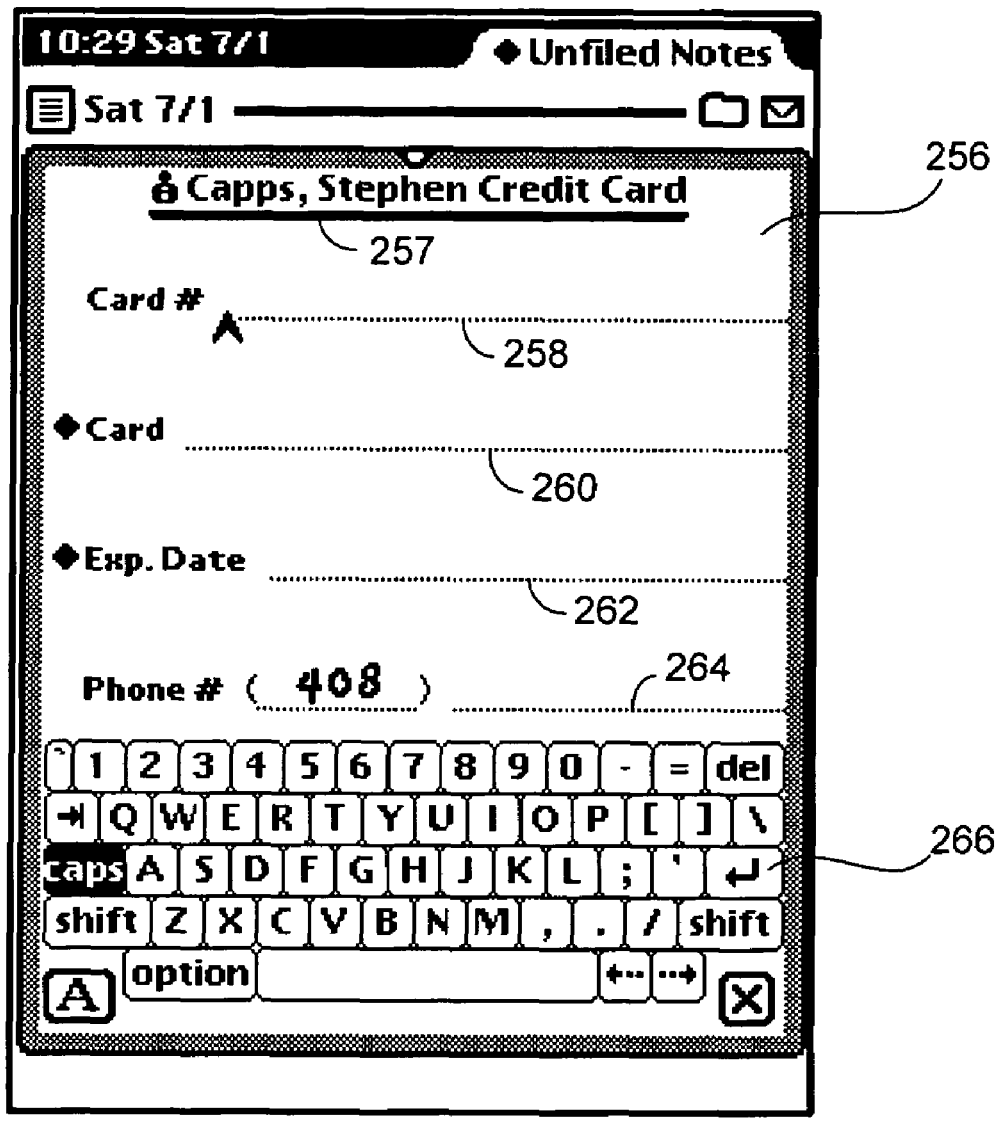
FIG. 8a is a screen shot showing a dialog box provided for entering information about a credit card associated with a given persona.
Figure 8B:
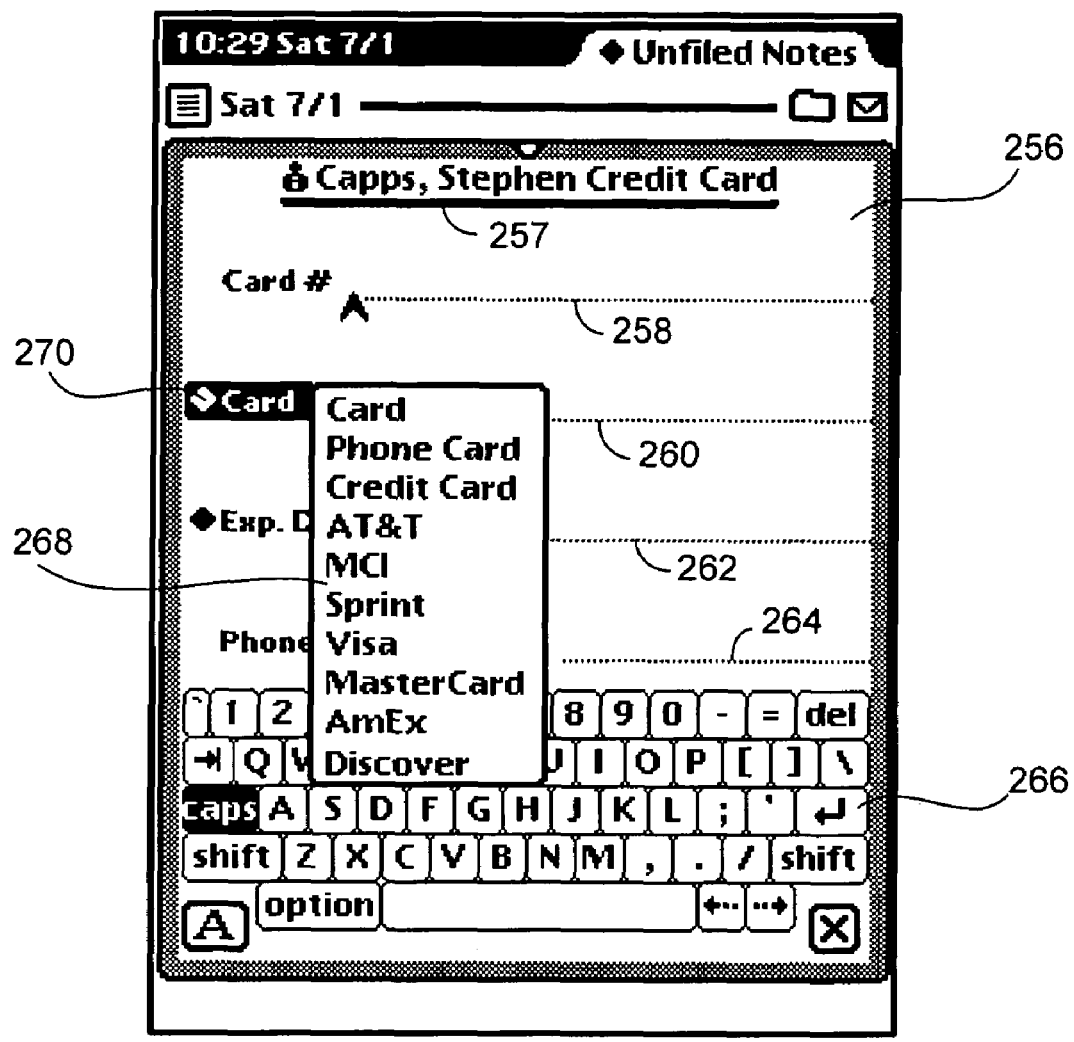
FIG. 8b is a screen shot as in FIG. 8a but showing a pop-up menu for selecting various types of credit cards.

Specific examples of the dialog boxes displayed to facilitate changing parameters are presented in FIGS. 8a, 8b, 9, 10a, and 10b. First, if a user selects the credit card entry by tapping on list 254, a new dialog window 256 will be displayed on the screen will be display on the screen as shown in FIG. 8a. Window 256 includes a heading 257 indicating the name of the persona and the type of parameter (credit card information) that the window to be modified. Window 256 includes a field 258 in which the user's credit card number may be entered by either handwriting or tapping keys from displayed keyboard 266. In addition, window 256 includes a field 260 for indicating the type of credit card, a field 262 for indicating the expiration date of the credit card, and field 264 for indicating a phone number associated with the credit card. A card type pop-up menu 268 will be displayed if the user taps on a card button 270 as shown in FIG. 8b. The menu 268 includes a list of various credit cards types that be provided in field 260. The user simply selects one of these cards by tapping on it with the stylus. Thereafter, the name of the card will appear in field 260.

Figure 9:
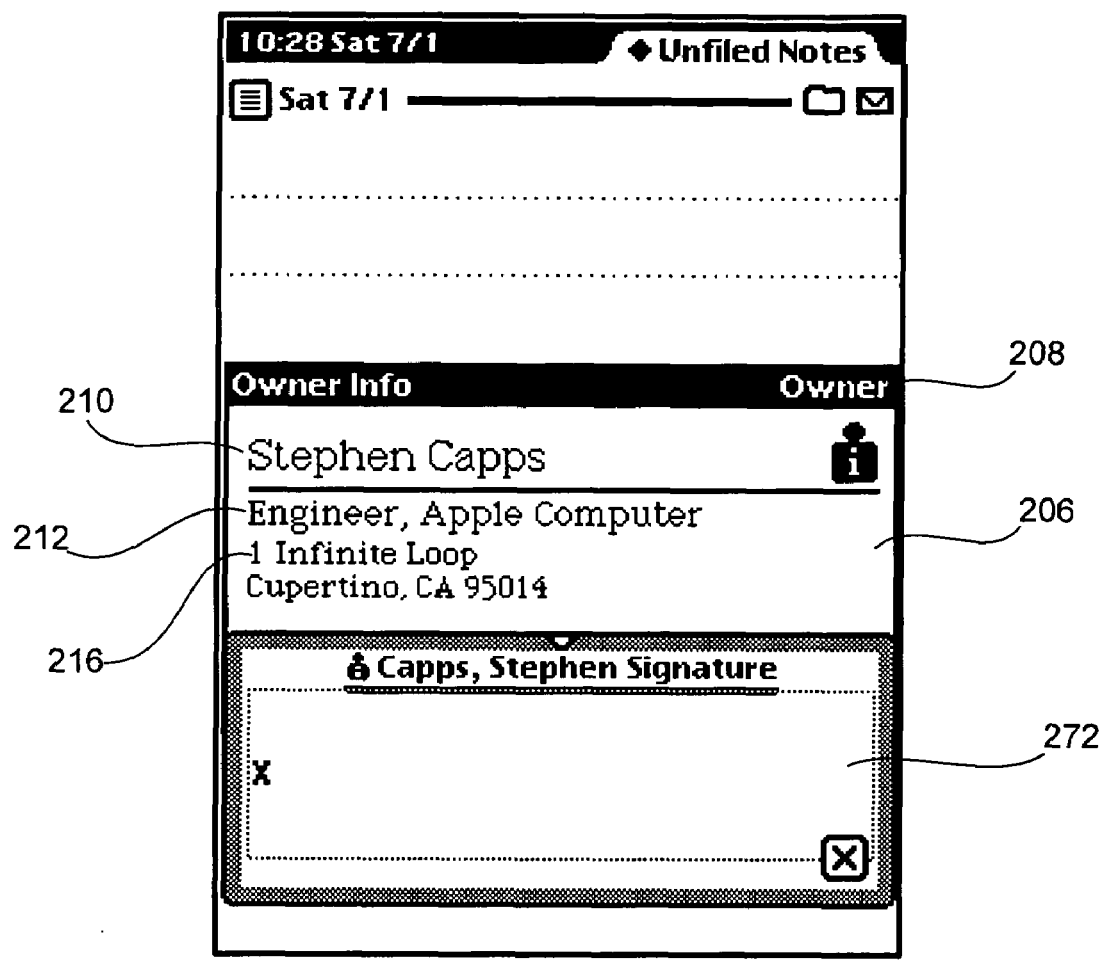
FIG. 9 is a screen shot showing a dialog box for entering a signature associated with a given persona.

As shown in FIG. 9 shows a dialog box 272 for inputting a signature associated with a persona. may be provided as a parameter. Specifically, dialog box 272 is displayed when the user selects the "signature" entry of menu 254 shown in FIG. 7. When dialog box 272 is displayed, the user simply writes his or her signature in the space provided within window 272. Thereafter, that signature will be associated with the persona currently indicated. This feature is useful when the user has different signatures for different personas. For example, a user may sign with his or her full name for business purposes, and may sign with his or her first name only for personal correspondence. Such signatures can be used in applications which generate automatic correspondence with a user's signature.

Figure 10A:
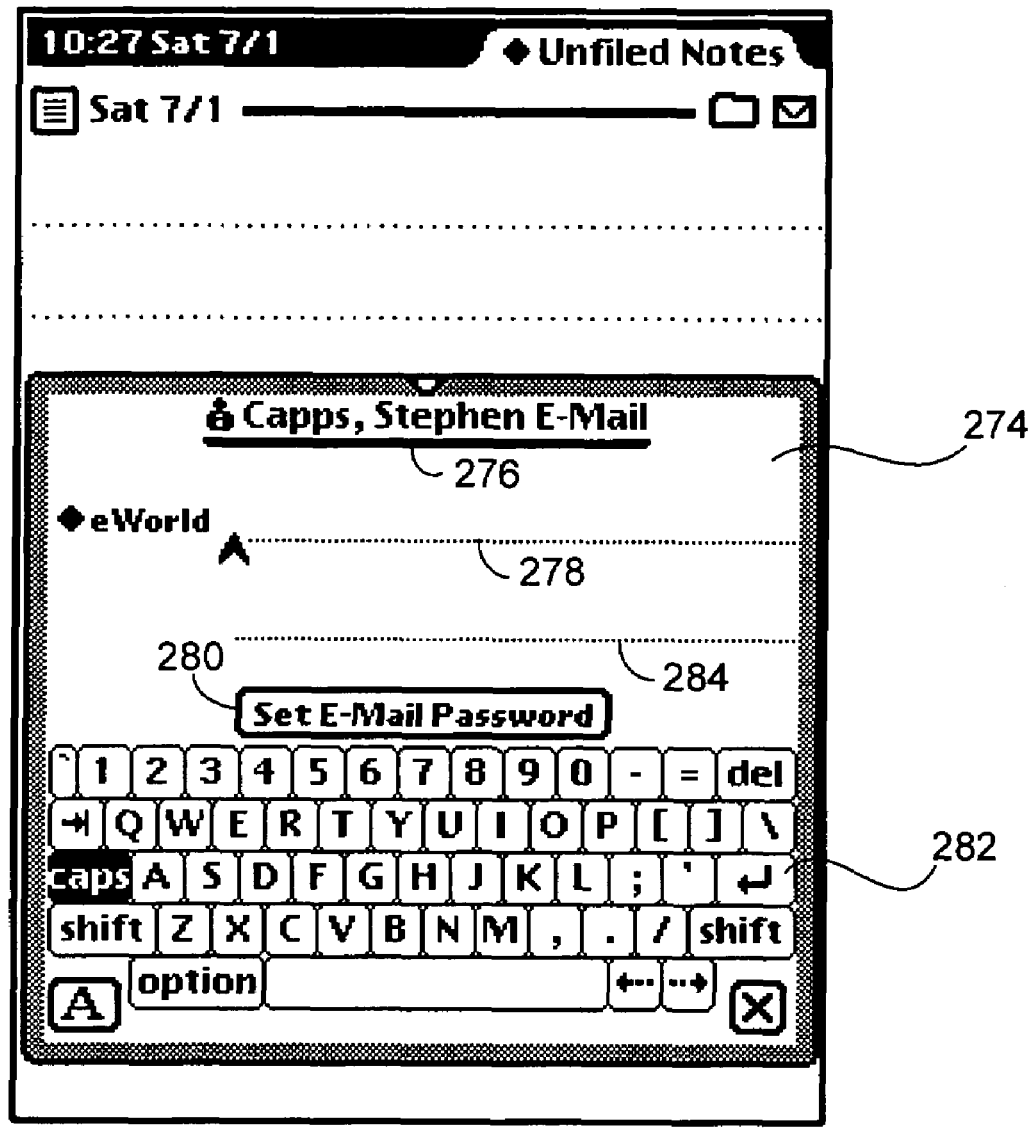
FIG. 10a is a screen shot showing a dialog box for entering values associated with e-mail parameters.
Figure 10B:
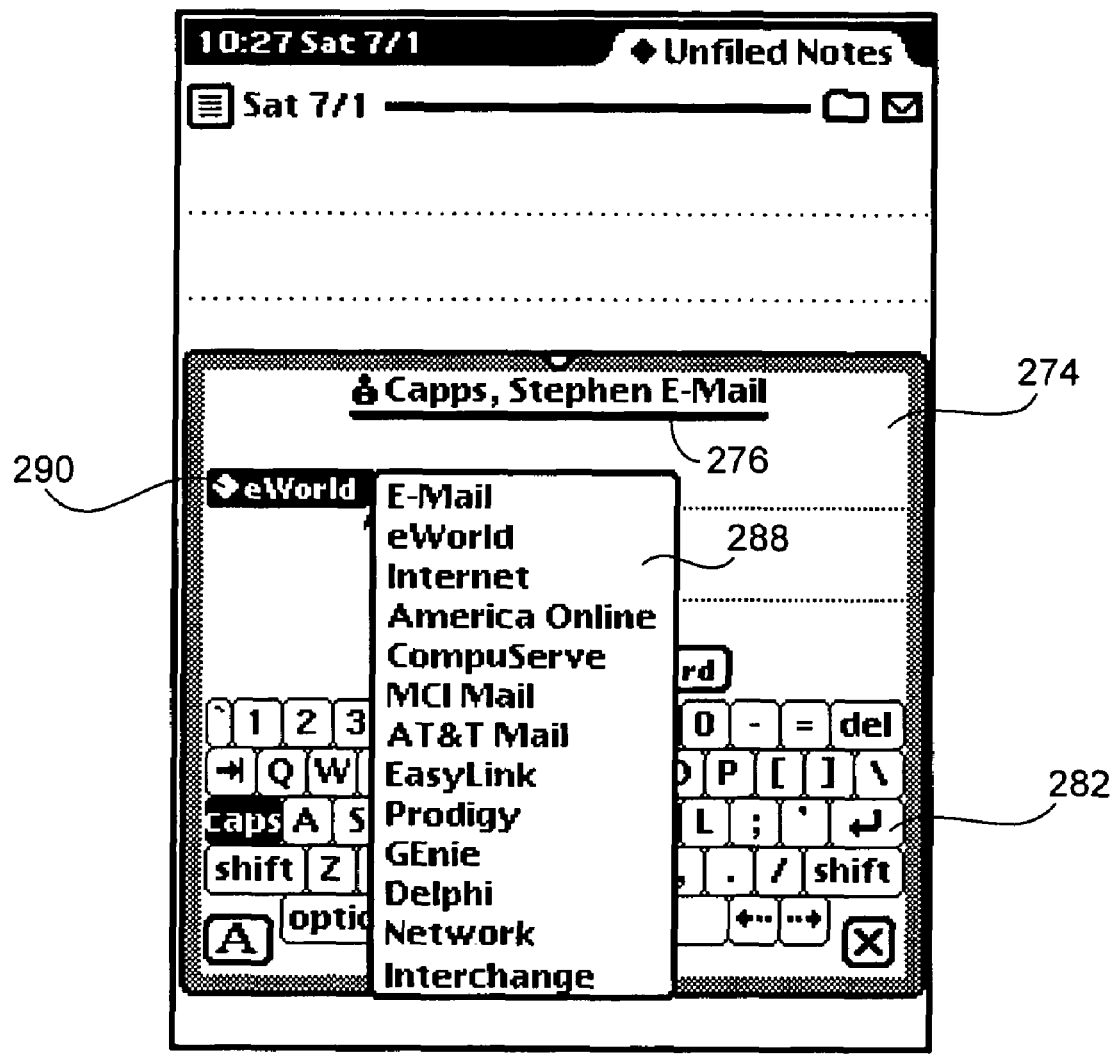
FIG. 10b is a screen shot as in FIG. 10a but additionally showing a pop-up menu for selecting a particular type of e-mail service.

FIGS. 10a and 10b show a dialog box 274 which is displayed in response to the user tapping on the "e-mail" entry of menu 254 shown in FIG. 7. As shown in FIGS. 10a and 10b, dialog box 274 includes a heading 276 specifying the name of the current persona, a field 278 for specifying the e-mail service used by the current persona, and a "set password" button 280 for setting the user's password. The user may type in his or her password (for the current persona) by selecting keys from a screen display keyboard 282. Alternatively, the user may simply handwrite in the password in field 284. FIG. 10b shows a pop-up menu 288 that appears on the screen after the user selects e-mail button 290. As shown, the menu 288 includes a list of various e-mail services, any one of which the user may select by tapping on it. The selected e-mail service thereafter will be displayed in field 278.

Method of Performing a Persona-Dependent Transaction

Figure 11:
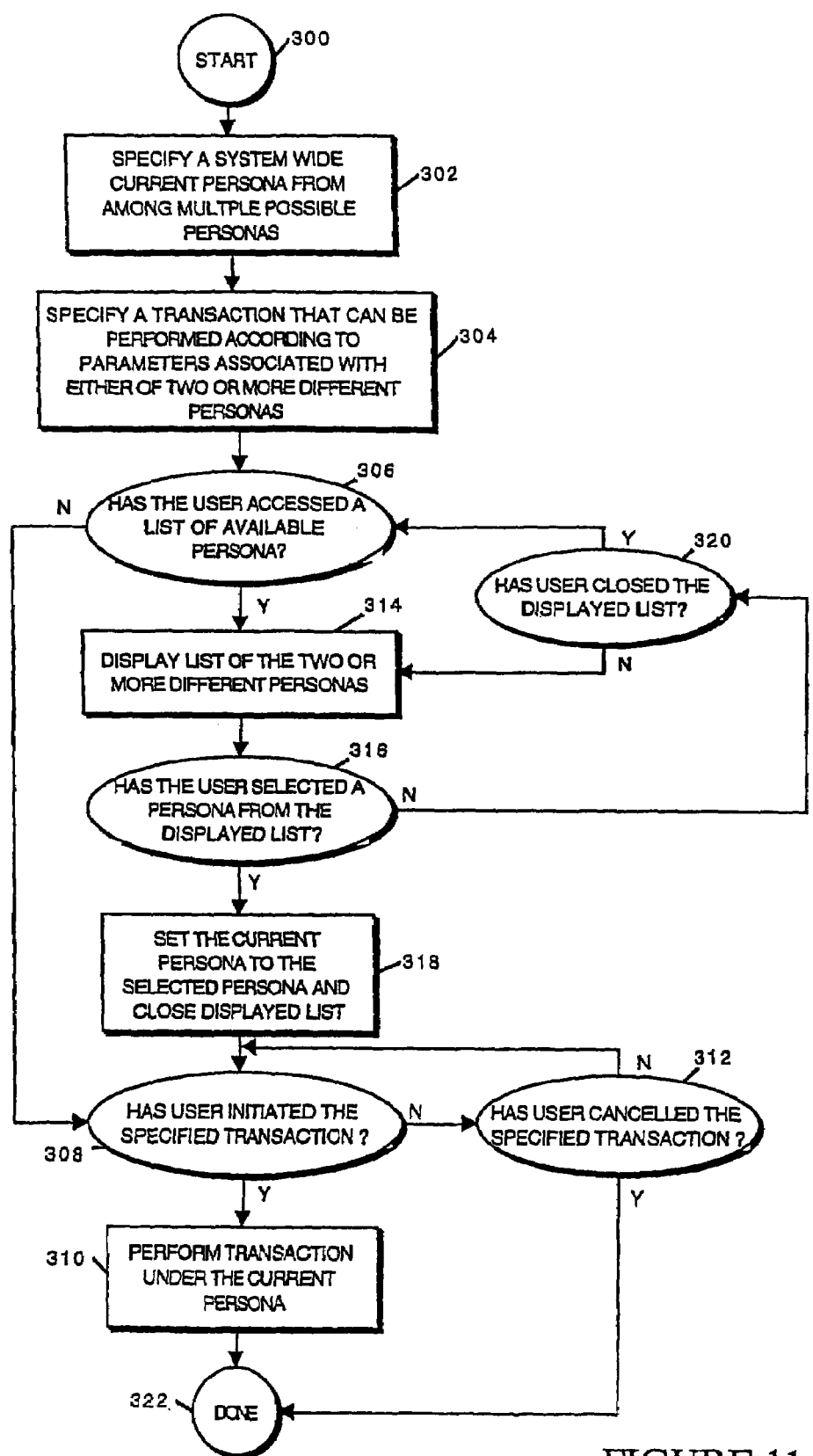
FIG. 11 is a process flow diagram depicting the general procedure for modifying a computer system's current persona and performing a transaction under that persona.

FIG. 11 presents a process flow diagram depicting a general procedure for performing a transaction with a computer system having multiple personas. The process begins at 300 and then, in a process step 302, the system specifies a system-wide current persona from among the machine's multiple possible personas. Next, at process step 304, the system specifies a transaction that can be performed according to a parameter associated with either of two or more different personas. This process step will be described in more detail with reference to FIGS. 13 and 17. After the transaction has been specified at process step 304, a decision step 306 determines whether the user has accessed a list of available persona. The user might do this by, for example, tapping on a button displayed for that purpose. Assuming that the user has not accessed such a list (i.e., decision step 306 is answered in the negative), a decision step 308 determines whether the user has initiated the specified transaction. Assuming that the user has initiated such transaction, a process step 310 performs that transaction under the current persona as specified at step 302. The process is then completed at 322. In other words, the transaction is completed with the set of parameters associated with the current persona.

Assuming, on the other hand, that decision step 308 is answered in the negative (i.e., the user has not initiated a transaction), a decision step 312 determines whether the user may have canceled the transaction specified at step 304. If so, the process is simply completed at 322 without performing any transaction. If not, process control simply returns to decision step 308.

If decision step 306 is answered in the affirmative (i.e., the user has accessed a list of available persona), a process step 314 displays a list of personas that are available for use with the computer system. Next, a decision step 316 determines whether the user has selected one of the personas displayed on the list. If so, a process step 318 sets the current persona to that persona selected from the display list. Concurrently therewith, the display list is closed from the screen. From there, process control is directed to decision step 308 where the system awaits a user initiated transaction. The system then handles further events as described above.

Assuming that decision step 316 is answered in the negative (i.e., the user has not selected a persona from the displayed list), a decision step 320 determines whether the user has closed the displayed list. If so, process control simply returns to decision step 306 where the system awaits the next action from the user. If, on the other hand, decision step 320 is answered in the negative, the list of personas remains displayed as indicated at step 314.

As indicated above, each persona has associated therewith a collection of specified values for parameters that may be varied as necessary to perform a specific computer transaction. Thus, the inventive procedure set forth in FIG. 11 has the benefit of allowing such personas to be switched easily by simply displaying a list of such personas, and allowing a the user to select one member of the that list as the "current persona."

Figure 12:
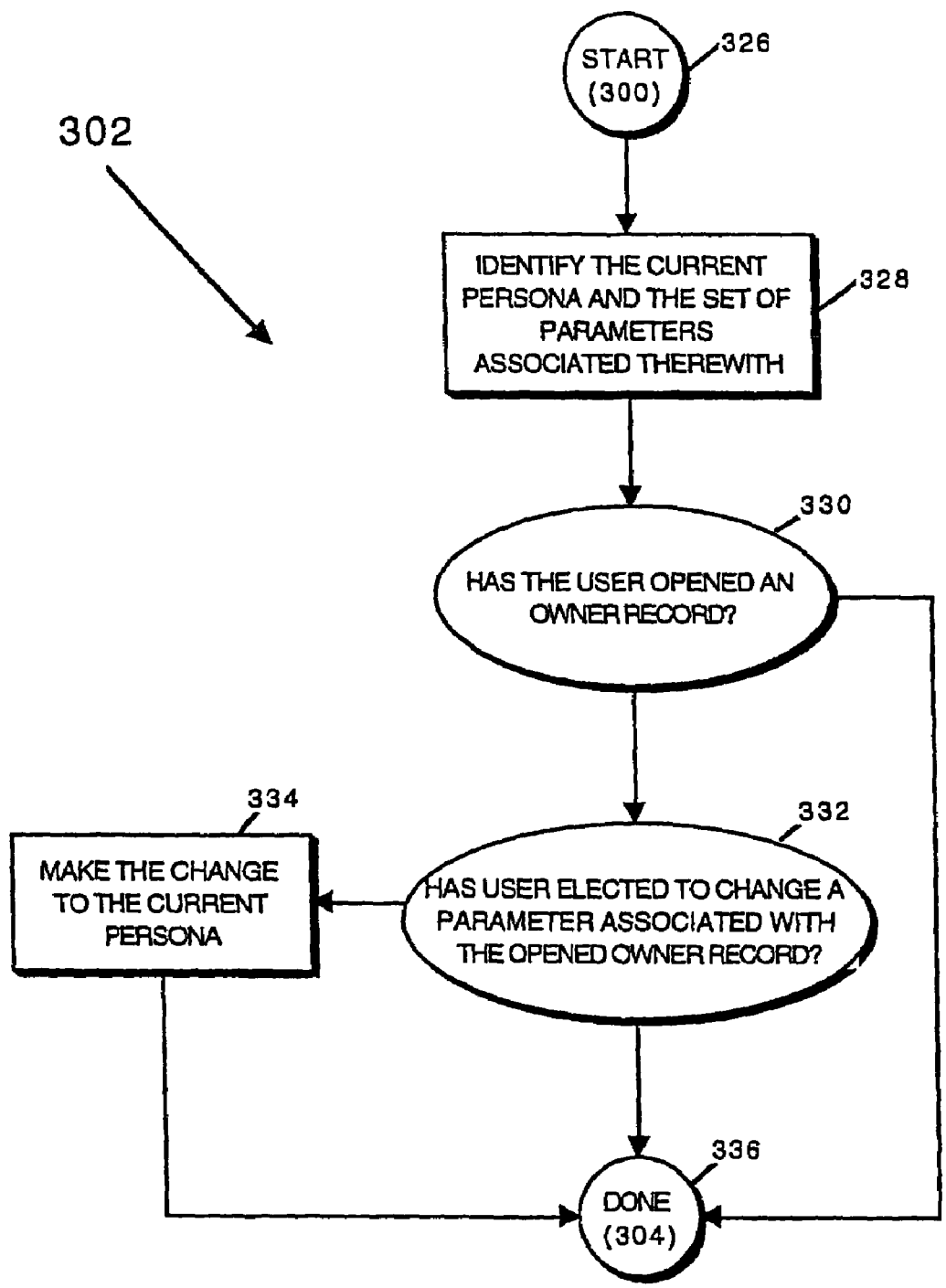
FIG. 12 is a process flow diagram illustrating the important steps in specifying a system-wide current persona from among multiple possible personas available to a computer system.

The process for specifying a system-wide current persona (step 302 of FIG. 11) is formalized in FIG. 12. The process depicted therein begins at 326 and proceeds to a process step 328 where the set of parameters associated with the current persona is determined. Thereafter, a decision step 303 determines whether the user has opened an ownership record. Examples of such records are depicted in FIGS. 4a and 4b as discussed above. Assuming that the user has not opened such owner record, the process is simply completed at 336 and the parameters of the current persona remain unchanged. If, however, decision step 330 is answered in the affirmative (i.e., the user has opened an owner record), then a decision step 332 determines whether the user has changed any parameter associated with the current persona. If not, the process is simply completed at 336 and the system waits for a transaction to be specified (at step 304 of FIG. 11). If, however, the user has elected to change a parameter of the currently opened ownership record, that change is made at a process step 334. Thereafter the process is completed at 336. As noted above, a user may indicate that he or she wishes to change a parameter associated with a current a persona by tapping an add button 232 to display a menu 254 listing available parameters (see FIG. 7). Thereafter, the particular parameter selected may be added or modified via user input in a dialog window such as those displayed in FIGS. 8a, 8b, 9, 10a, and 10b.

It should be noted that the step of determining the set of parameters associated with the current persona may be implemented in various manners. For example, each persona may have its own password. When the user turns on his or her hand-held computer system, the system prompts the user for a password. If user enters the password for persona 1, that persona becomes the current persona, if the user enters the password for persona 2, that persona becomes the current persona, etc. Other approaches may also be employed. For example, the computer system may be set up such that when it is turned on, the current persona the same persona that was used when the computer system was last operated. Still further, the system may have a default persona that is always used, unless the user changes it.

Figure 13:
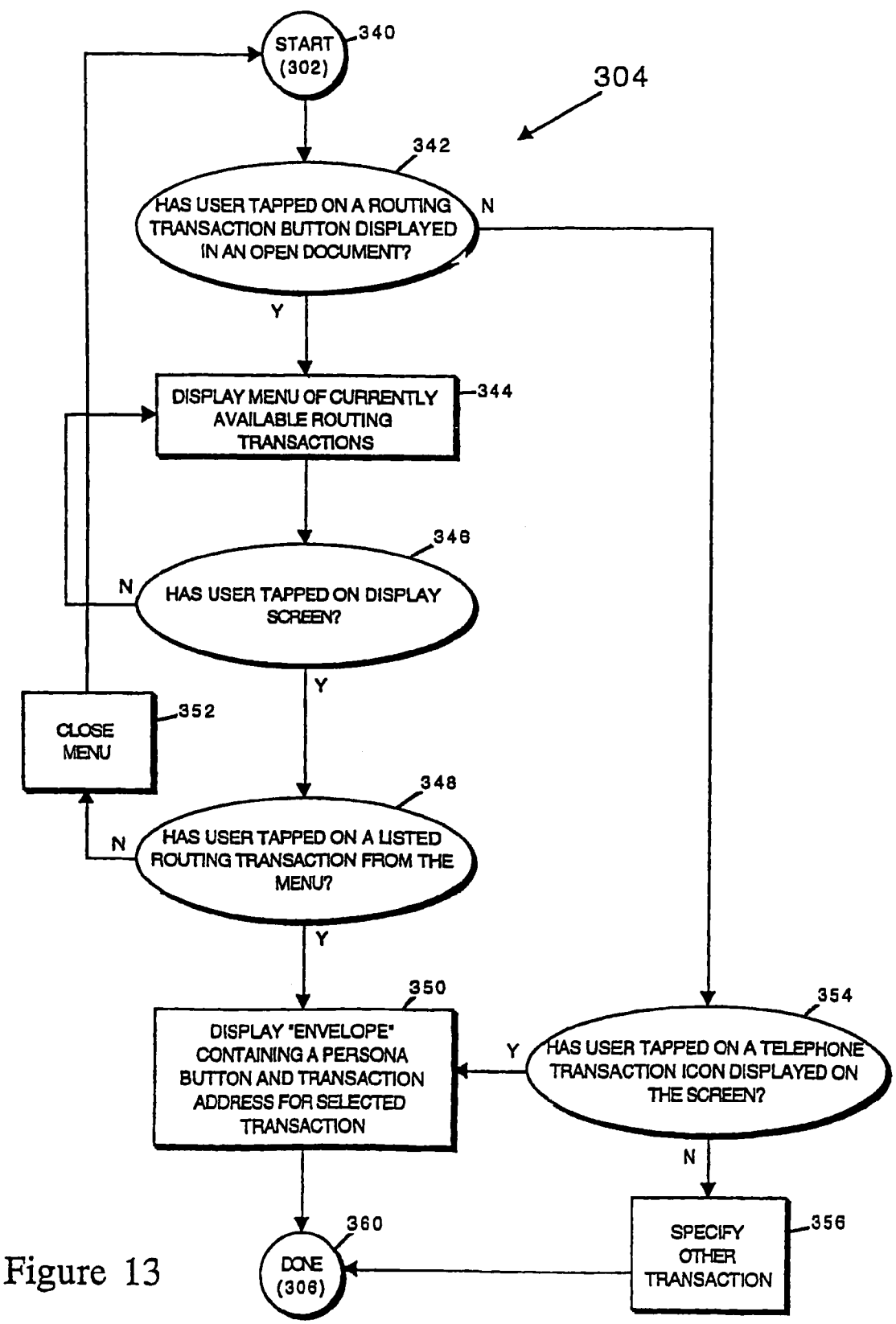
FIG. 13 is a process flow diagram depicting the steps that may be performed in specifying a persona-dependent transaction in accordance with one embodiment of this invention.

FIG. 13 provides a process flow diagram detailing one implementation of the step of specifying a transaction (i.e., step 304 of FIG. 11). The process begins at 340 and then, at a decision step 342, the system determines whether the user has tapped on a transaction button displayed in an open document. If so, a process step 344 displays a menu of currently available transactions in response to the user's input. Next, a decision step 346 determines whether the user has tapped anywhere in the display screen. If not, the menu remains displayed as indicated by the arrow back to process step 344. If, on the other hand, the user has tapped on the display screen, a decision step 348 determines whether the user has tapped on a listed transaction from the menu. If so, a process step 350 displays a routing slip (preferably in the form of an "envelope") containing at least (1) a persona button for displaying a list of various available personas, and (2) a transaction address for this selected transaction. The process is then completed at 360 (corresponding to decision step 306 of the FIG. 11 process).

If decision 348 determines that the user has not tapped on a listed transaction from the menu, the menu is simply closed (i.e., removed from the display screen) at a process step 352. Process control thereafter returns to 340.

In addition to the various routing transactions associated with the above described process steps, preferred embodiments of this invention allow the user to apply multiple personas to certain telephone-based transactions. This is indicted by the process path taken if decision step 342 is answered in the negative (i.e., the user has not tapped on a routing transaction button.) If this is case, a decision step 354 determines whether the user has selected a telephone transaction icon displayed on the computer screen. If so, an envelope is displayed at process step 350 as described above. If, however, the user has neither selected a routing transaction button nor selected a telephone transaction icon, a process step 356 specifies another transaction which is treated according to the steps depicted in FIG. 11.

Figure 14:
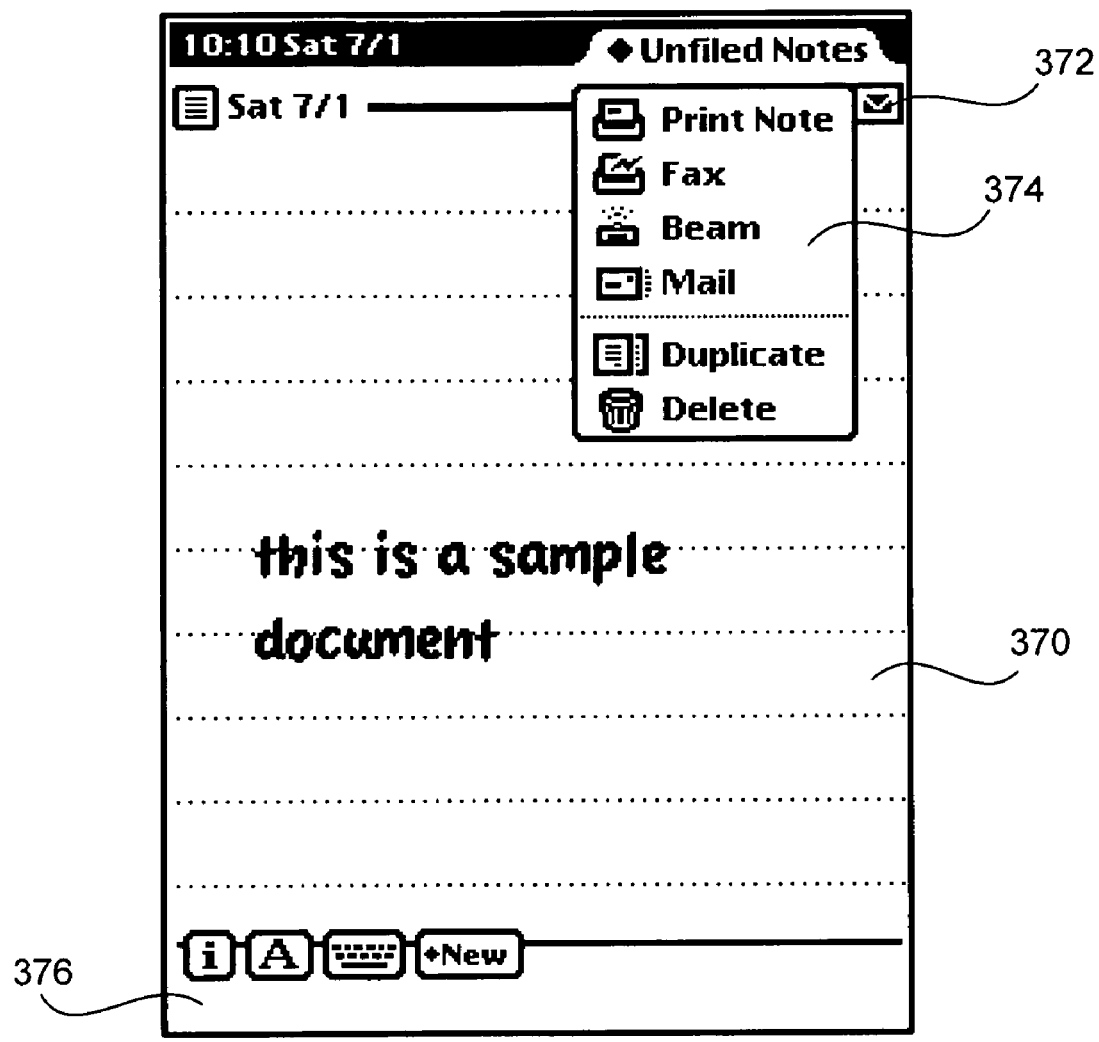
FIG. 14 is a screen shot showing a pop-up menu that lists available routing actions.

The process depicted in FIG. 13 may be further understood with reference to various user interface screen shots presented in FIGS. 14, 15*a*-D, and 16*a*-D. Each of these screen shots, like all of those presented above, is preferably provided via the view system previously described. FIG. 14 presents a sample "note" document which may be routed according to various options. Such note documents are described in U.S. Pat. No. 5,398,310 issued Mar. 14, 1995, and naming Michael C. Tahao and Stephen P. Capps as inventors, and in U.S. patent application Ser. No. 08/127,211, filed on Sep. 24, 1993, naming Michael C. Tchao and Stephen P. Capps as inventors, and entitled METHODS FOR MANIPULATING NOTES ON A COMPUTER SCREEN, now U.S. Pat. No. 5,563,996. Both documents are incorporated herein by reference for all purposes. It should be noted that the note application displays a group of control buttons 376 at the bottom of the screen as shown.

Routing options for a note document are accessed when the user taps a routing action button 372 to display a routing menu 374 listing four routing actions (printing, faxing, beaming, and mailing) together with "duplicate" note and "delete" note actions. Putting the screen interface of FIG. 14 in the context of the process depicted in FIG. 13, one can see that when the user taps button 372 decision step 342 is answered in the affirmative. Then, the menu listing available routing transactions is displayed as menu 374 in FIG. 14 (in accordance with step 344).

Figure 15A:
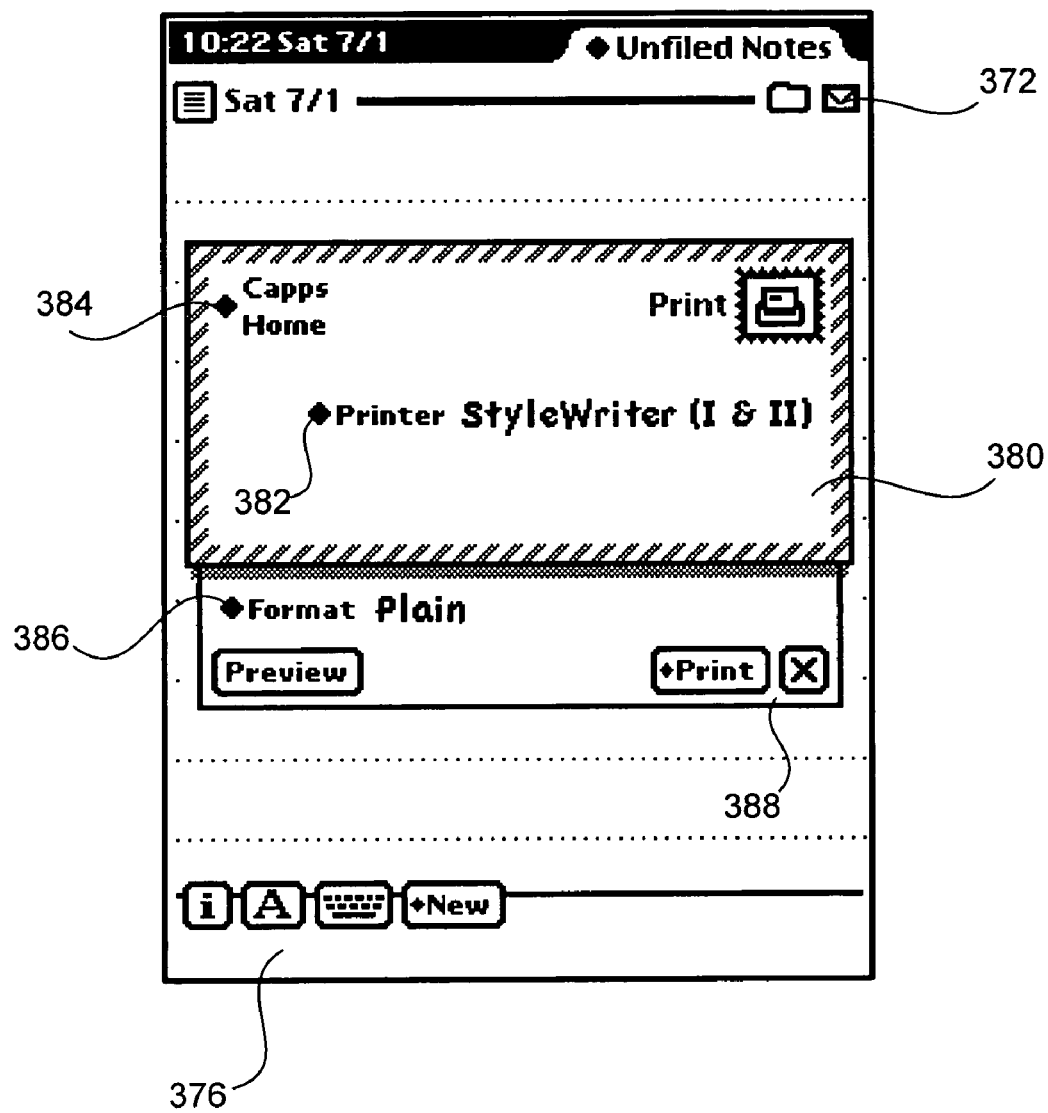
FIG. 15a is a screen shot showing a "printer" routing slip in the form of an envelope.

If the user taps on the print note routing action of menu 374, an envelope routing slip 380 is displayed as shown in FIG. 15*a*. Certain features of the routing slip 380 are worth noting. First, it includes various control buttons 388 including a preview button, a print button, and a close button (indicated by the "X"). In addition, it includes a format button 386 which when selected provides various formatting options for the printed note, and a printer button 382 which when selected displays a list of available printers to which the hand-held computer system may print. A very important feature in the context of this invention is persona/worksite button 384. When this button is selected, a list of personas and worksites is displayed. Continuously displayed beside the button 384 are the current persona (Capps) and the current worksite (home). Note that the current persona and worksite automatically specify the printer destination (in this instance Style-Writer) as displayed beside button 382.

Figure 15B:
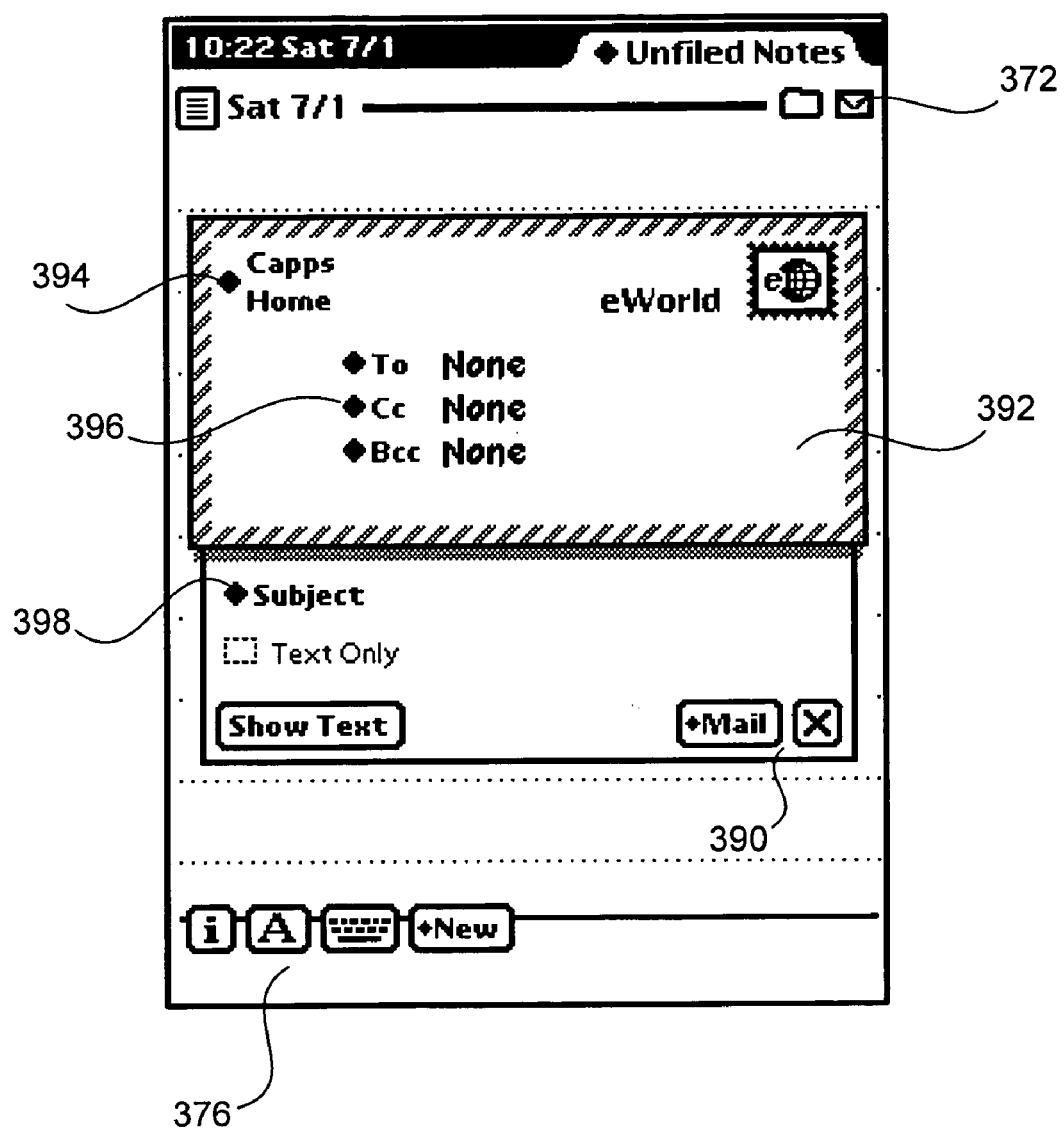

FIG. 15*b* presents a screen shot illustrating another variation on this theme. In this case, a routing slip 392 for sending an e-mail message is displayed when the user taps on the mail entry of menu 374 (FIG. 14). As shown, the e-mail slip 392 includes a collection of control buttons 390, a subject heading button 398, destination buttons 396, and persona/worksite selection button 394. Also as shown, the current persona is Capps and the current worksite is home. By specifying this information, certain parameters associated with e-mail such as a local phone number (worksite) and an e-mail account (persona) are automatically specified.

Figure 15C:
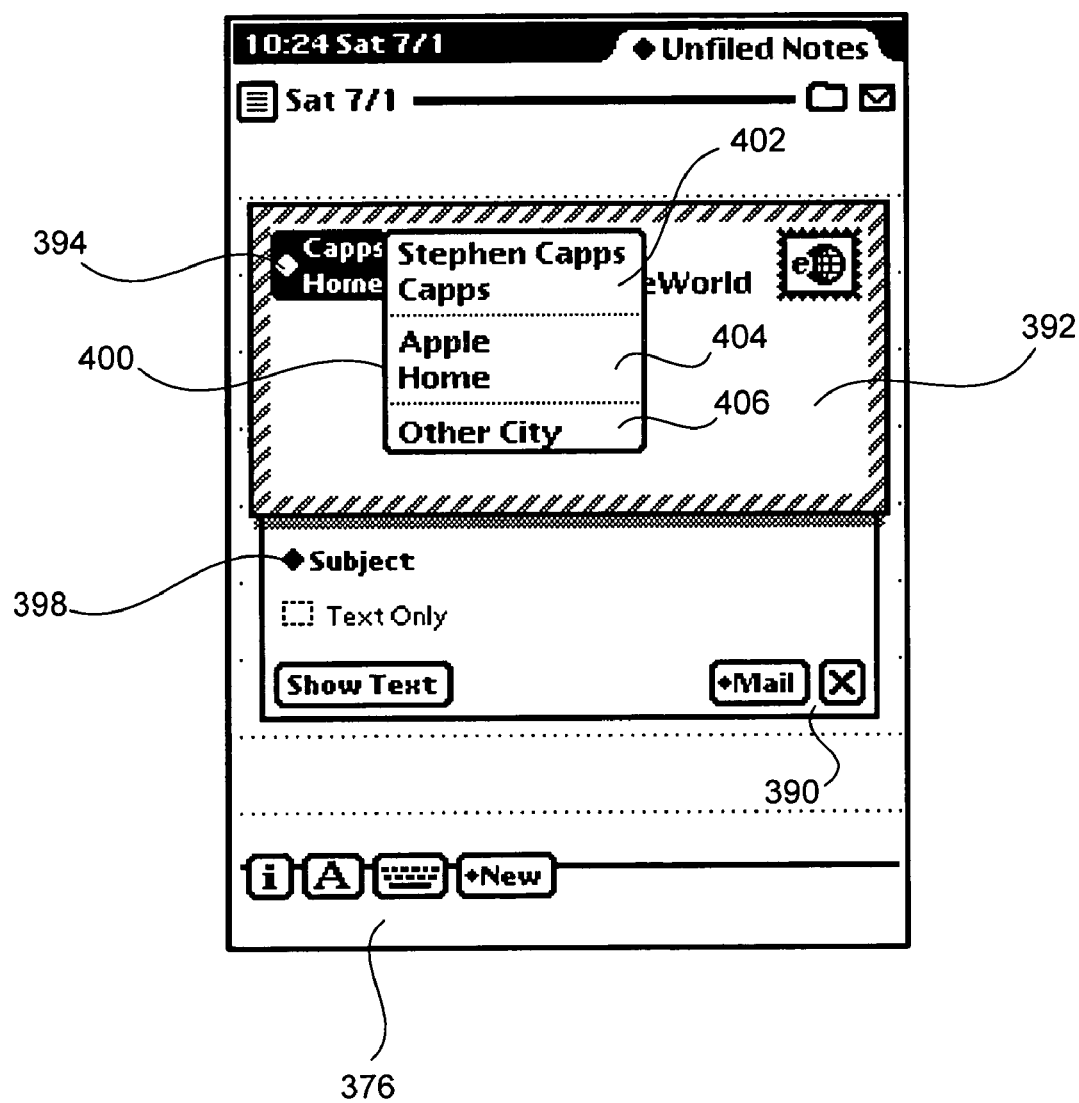
FIG. 15c is a screen shot of a routing slip as in FIG. 15b but, in addition, showing a pop-up menu for changing the current persona and/or current worksite associated with the computer system.

FIG. 15*c* illustrates how the screen changes when the user taps on persona/worksite button 394. As shown, the current persona (Capps) and current worksite (home) are highlighted, and, at the same time, a menu 400 displaying a list of available personas and worksites is displayed. Also as shown, menu 400 includes a persona section 402 listing the personas available to the computer system, a worksite section 404 listing the worksites available to the computer, and a city section 406 which may be used to specify a particular city (and associated parameters) where the hand-held computer may be used. The user may change a current persona simply by selecting (by for example tapping on) one of the listed personas in section 402. The basic process of displaying menu 400 and selecting a persona represents one implementation of steps 306, 314, 316, and 318 of FIG. 11. It should be noted that by specifying a "city" for the computer system various relevant parameters may automatically assume appropriate values such as the area code of the city.

Figure 15D:
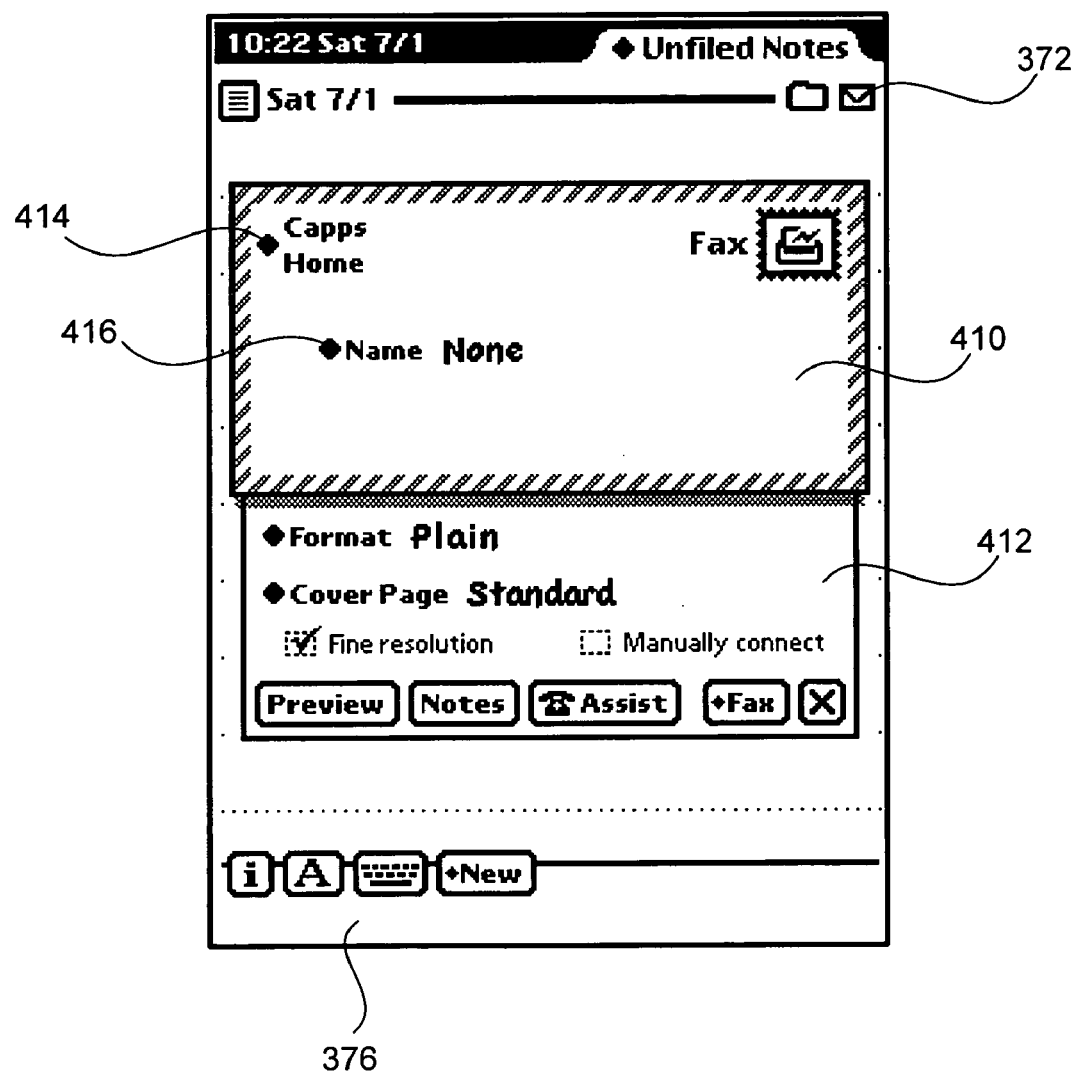

FIG. 15*d* illustrates yet another envelope-type routing slip displayed in accordance with a preferred embodiment of this invention. As shown, a routing slip 410 is displayed in response to a tap on the fax entry of menu 374 shown in FIG. 14. The fax routing slip has associated therewith a control button section 412 as well as a destination address button 416, and a persona/worksite selection button 414. Button 414 operates in the same manner as button 394 shown in FIGS. 15*b* and 15*c*.

Figure 16A:
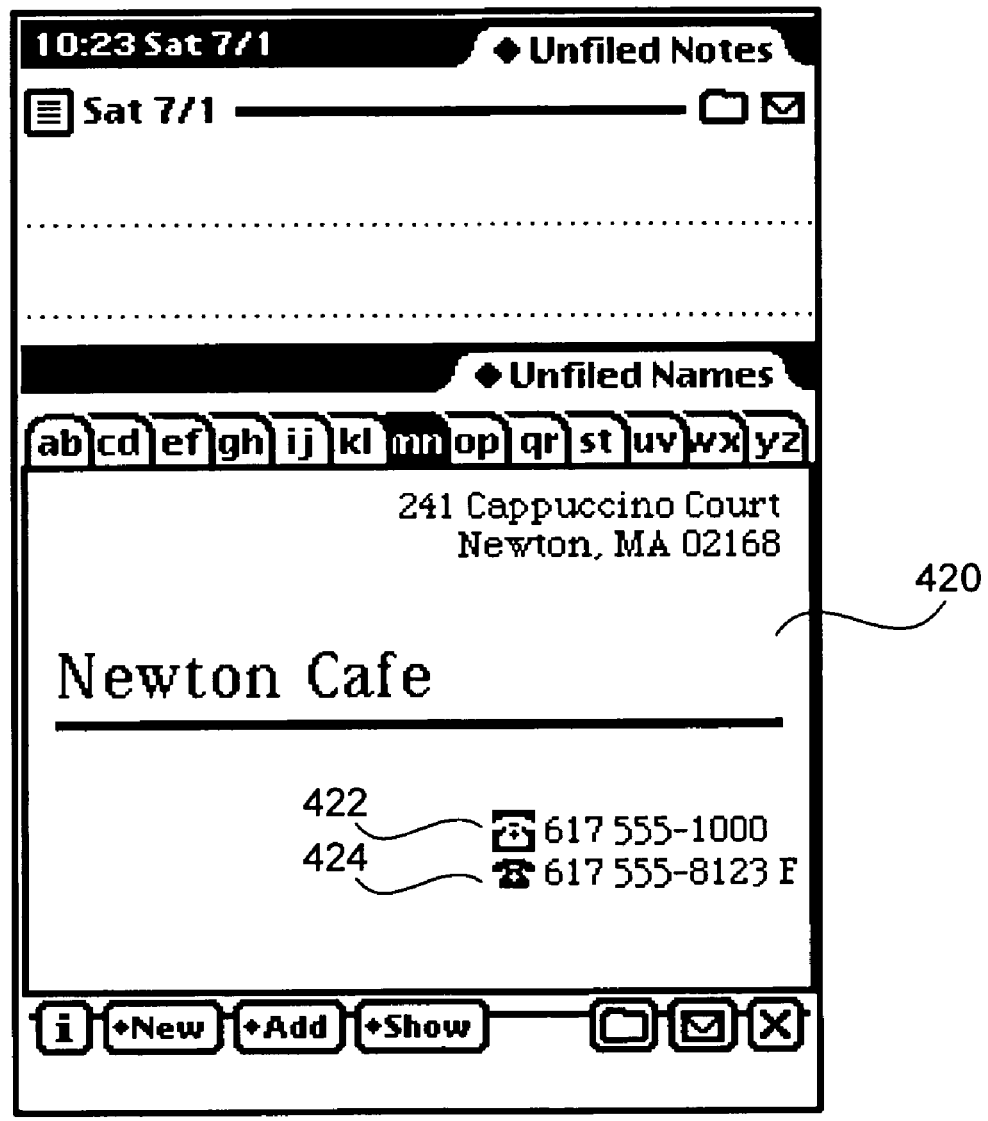
FIG. 16a is a screen shot showing a dialog box with a telephone icon for dialing a given telephone number.
Figure 16B:
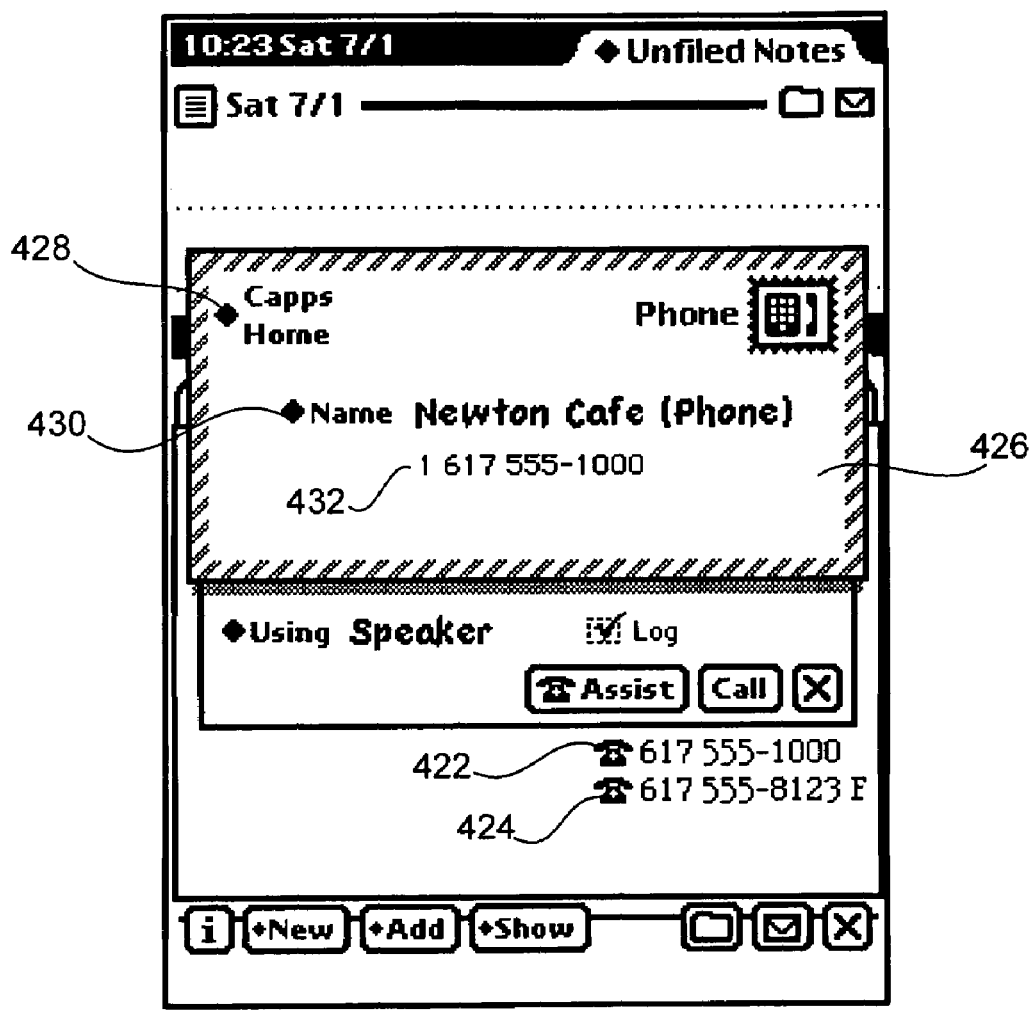
FIG. 16b is a screen shot showing a "phone" routing slip which would be displayed if the telephone icon shown in a screen shot of FIG. 16a is selected.

As noted in the discussion of FIG. 13, a transaction may be selected by tapping on a telephone icon (see decision step 354). FIG. 16*a* is screen shot illustrating how such telephone transaction icons can be displayed. As shown, a document 420 (in a "names" application) displays two telephone transaction icons 422 and 424. If a user taps on icon 422, an "envelope-type" routing slip 426 is displayed on the screen as shown in FIG. 16*b*. As shown, routing slip 426 includes a persona/worksite button 428 and a destination button 430. The appropriate dialing sequence is listed below the destination button 430 in a field 432. It should be noted that the appropriate dialing prefixes are automatically entered in field 432 based upon the selected persona/worksite.

Figure 16C:
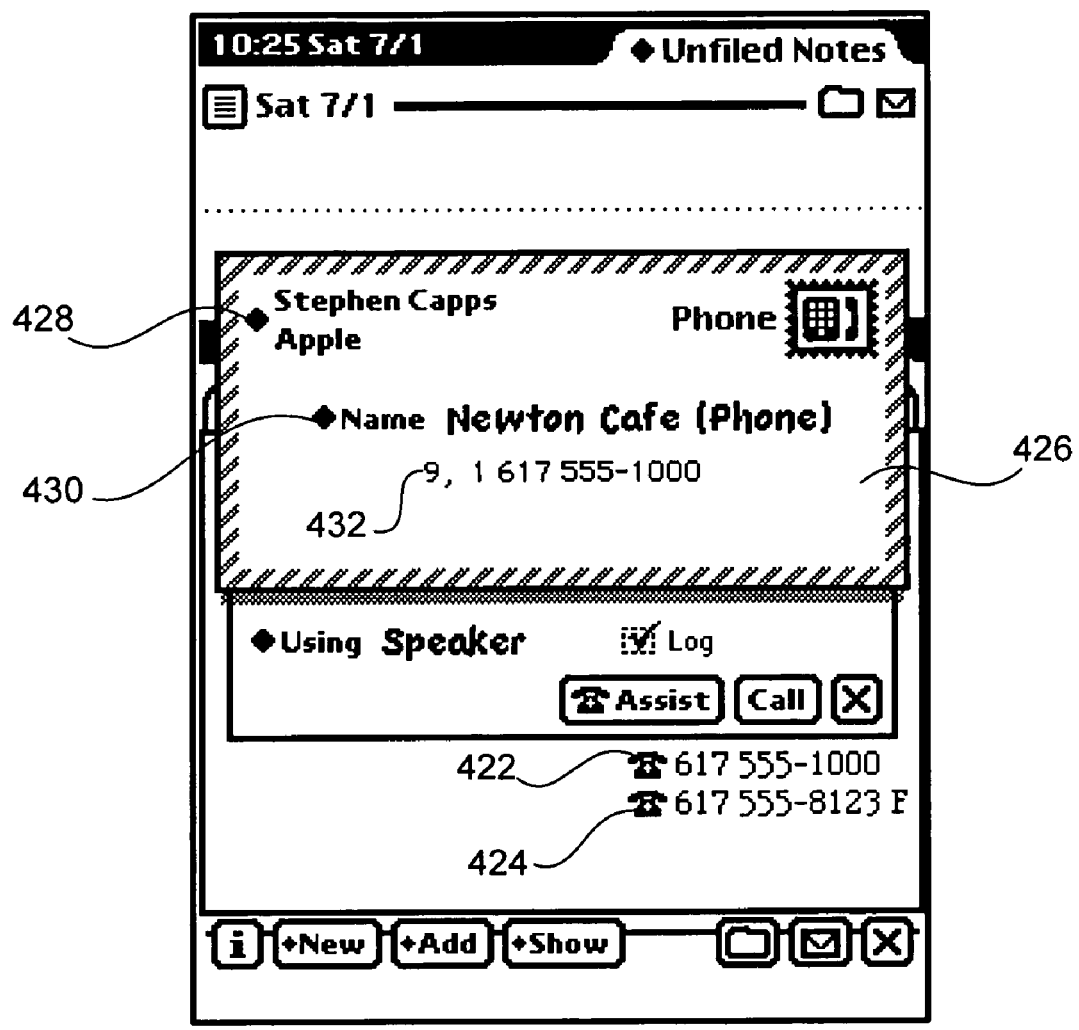
FIG. 16c is a screen shot showing the "phone" routing slip as shown in FIG. 16b, but with a different worksite selected.
Figure 16D:
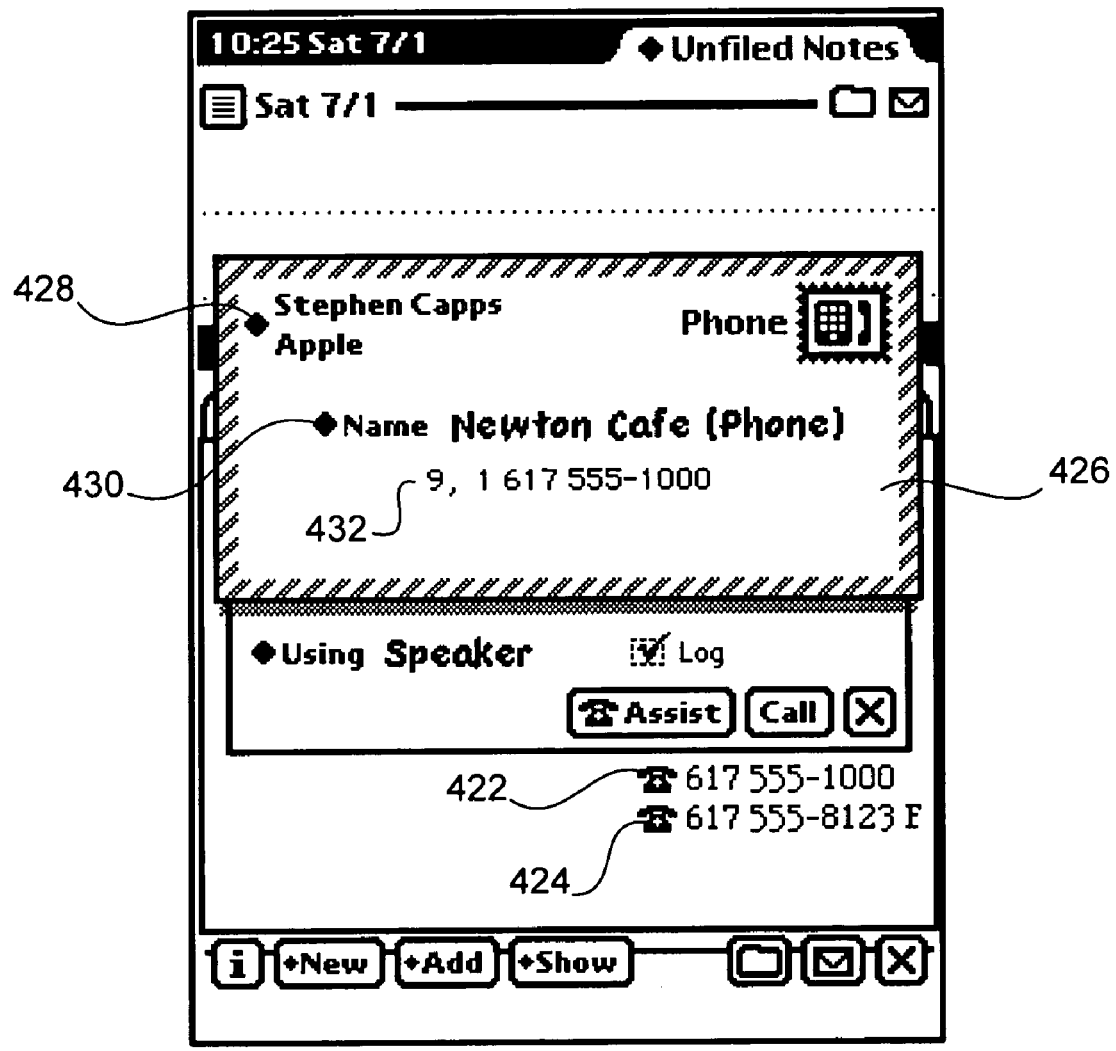
FIG. 16d is a screen shot showing the "phone" routing slip as in FIG. 16b, but with a different persona selected.

FIGS. 16*c* and 16*d* are screen shots of the same telephone routing slip 426 displayed in FIG. 16*b*, but with a different persona (FIG. 16*c*) and a different worksite (FIG. 16*d*). As shown in FIG. 16*c*, the display screen presents essentially the same graphical and textural information, with the exception that the persona name adjacent to button to 428 has been changed. Similarly, the routing slip shown in FIG. 16*d* has had the displayed worksite (adjacent button 428) changed. It is also worth noting that in FIG. 16*d* the telephone number depicted in field 432 has been changed to indicate that a dialing prefix of 9 is required for the specified worksite. This change occurs automatically upon switching worksites. Likewise, many of the parameters associated with a persona are automatically changed by switching the computer system's current persona (which is listed beside button 428).

It should be noted that although an "envelope-type" routing slip has been depicted in FIGS. 15*a*-15*d* and 16*a*-16*d*, many other routing slip formats are suitable for use with the present invention. However, the envelope metaphor is particularly preferred because many routing actions involve "sending" information to a remote location in a manner analogous to sending a mail message.

It should also be noted that many of the steps involved in actually performing a routing action are described in the U.S. patent application Ser. No. 08/130,049, filed Sep. 30, 1993, naming Gregg S. Foster, John R. Meier, and Stephen P. Capps as inventors, and entitled METHOD FOR ROUTING ITEMS WITHIN A COMPUTER SYSTEM, now U.S. Pat. No. 5,596,697. That application is incorporated herein by reference for all purposes. In preferred embodiments, any application written to employ the routing system described therein will have access to the persona-dependent features of this invention.

Figure 17:
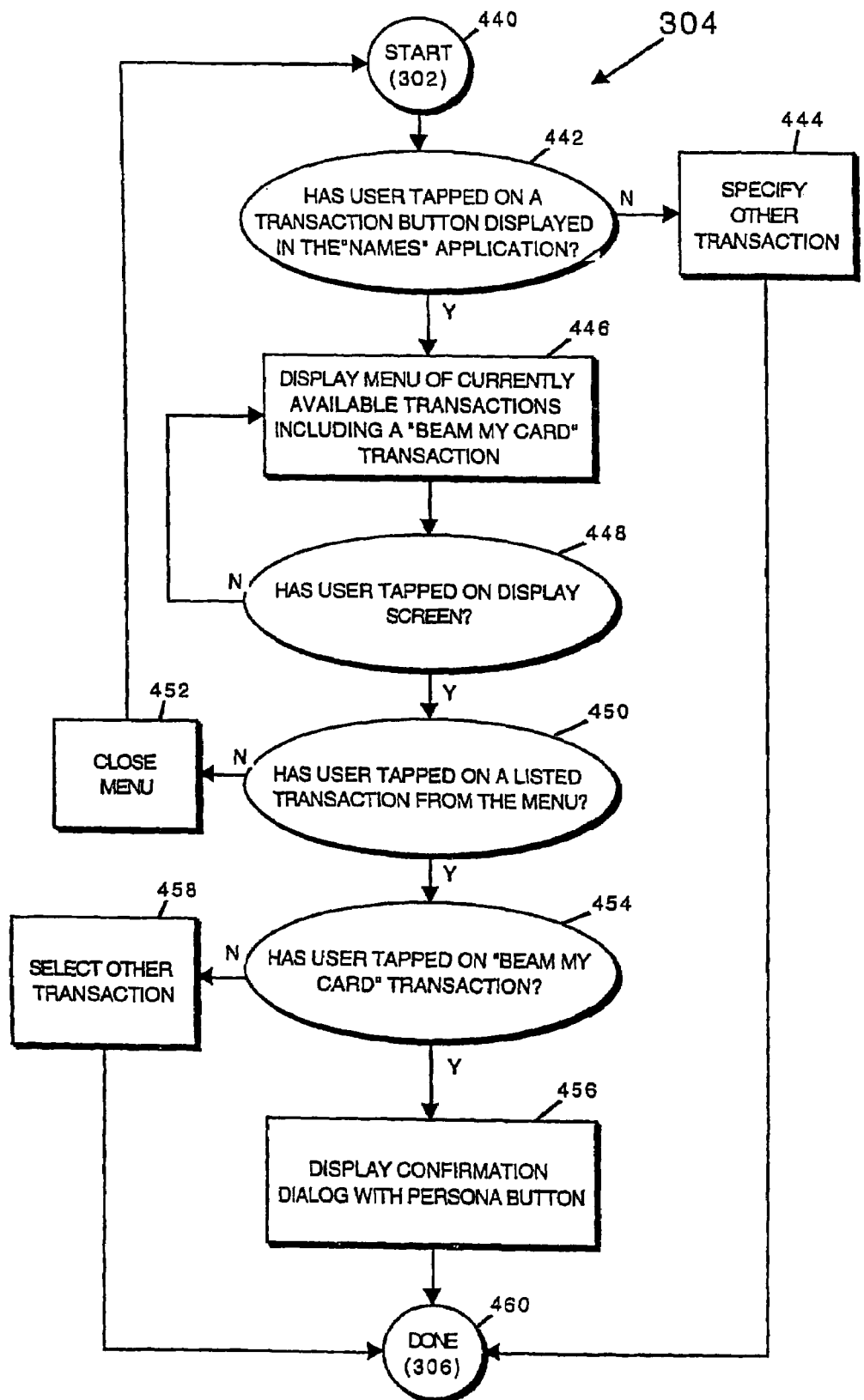
FIG. 17 is a process flow diagram depicting the steps that may be performed in specifying a computer transaction in accordance with separate embodiment of this invention.

FIG. 17 details a procedure for selecting a transaction in which the current persona plays a role (i.e., step 304 of FIG. 11). This procedure should be viewed as an embodiment which is provided in parallel with the embodiment depicted in FIG. 13. That is, preferably computer systems of this invention implement both the procedure of FIG. 13 and the procedure of FIG. 17. The procedure of FIG. 17 depicts a method of sending a "business card" containing information specific to the current persona of the computer system. Preferably, this embodiment is implemented with the infrared (IR) transceiver 92 of the pen-based computer system of FIG. 1. The procedure detailed in FIG. 17 presumes that the user is working a "names" application that contains a collection of electronic business cards, each containing relevant information about a person or one of that person's personas.

The process begins at 440 and then, at a decision step 442, determines whether the user has tapped on a transaction button displayed in the "names" application. If not, the system simply processes another transaction specified by the user at a process step 444. Thereafter, the process is concluded at 460. If, on the other hand, decision step 442 is answered in the affirmative, a menu of currently available transactions including a "Beam My Card" transaction will be displayed at a process step 446 (see FIG. 18). Thereafter, a decision step 448 determines whether the user has tapped on the display screen. If not, the system simply continues to display the menu of currently available transactions as indicated by the arrow back to process step 446. If, however, the user has tapped on the display screen, a decision step 450 determines whether the user has tapped on a listed transaction from the menu. If not, the menu is simply closed at a process step 452 and process control is returned to 440. If however, the user has tapped on a transaction from the menu, a decision step 454 determines whether the user has tapped on the "Beam My Card" transaction. If so, a process step 456 displays a confirmation dialog box with a persona button. Thereafter the process is concluded at 460 corresponding to step 306 of FIG. 11.

If decision step 454 determines that the user has not in fact tapped on the "Beam My Card" transaction, whichever transaction has, in fact, been tapped on is selected at a process step 458. Thereafter the process is concluded at 460.

Figure 18:
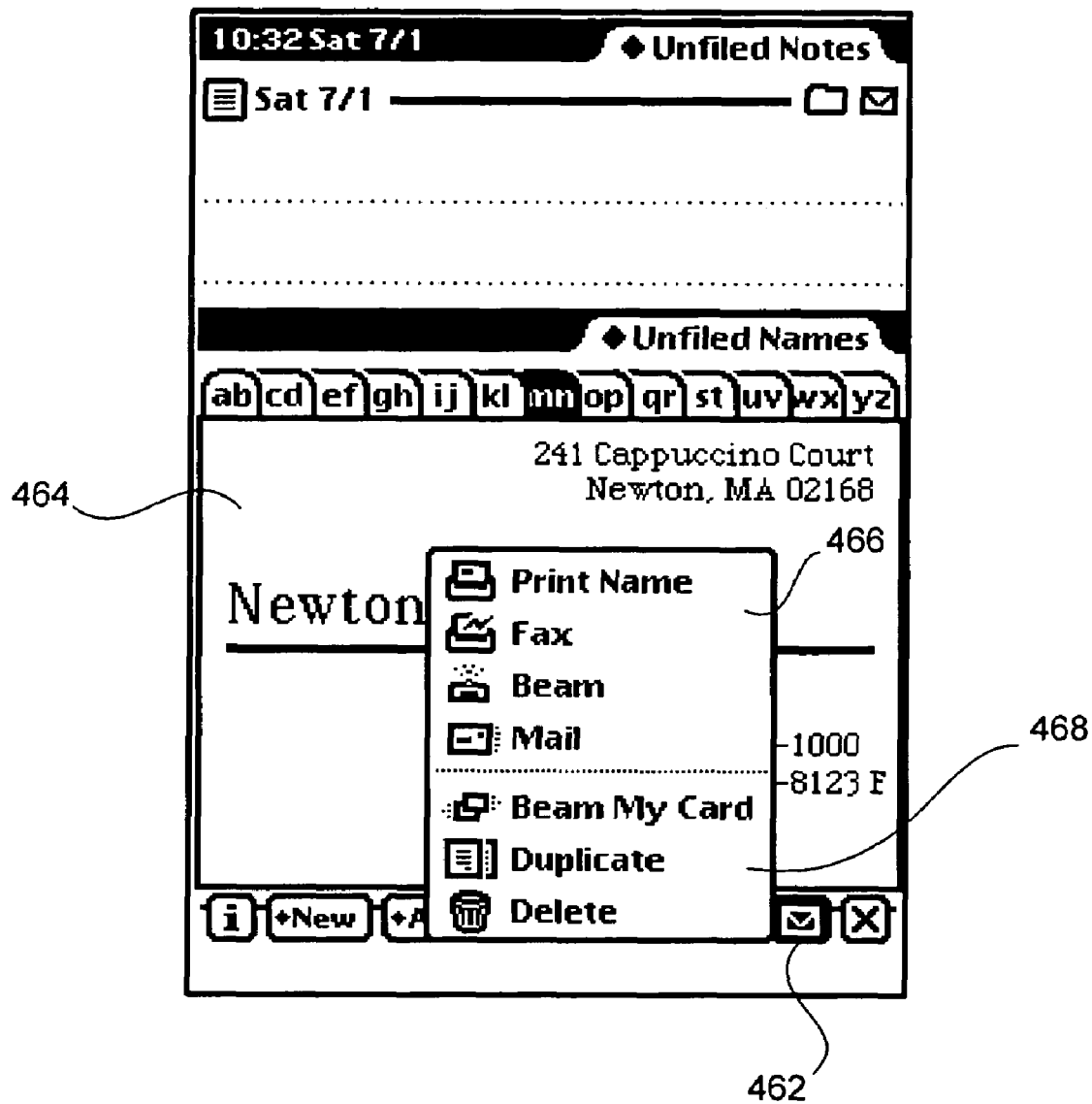
FIG. 18 is a screen shot showing a pop-up menu listing routing actions that are available in a "names" application.
Figure 19A:
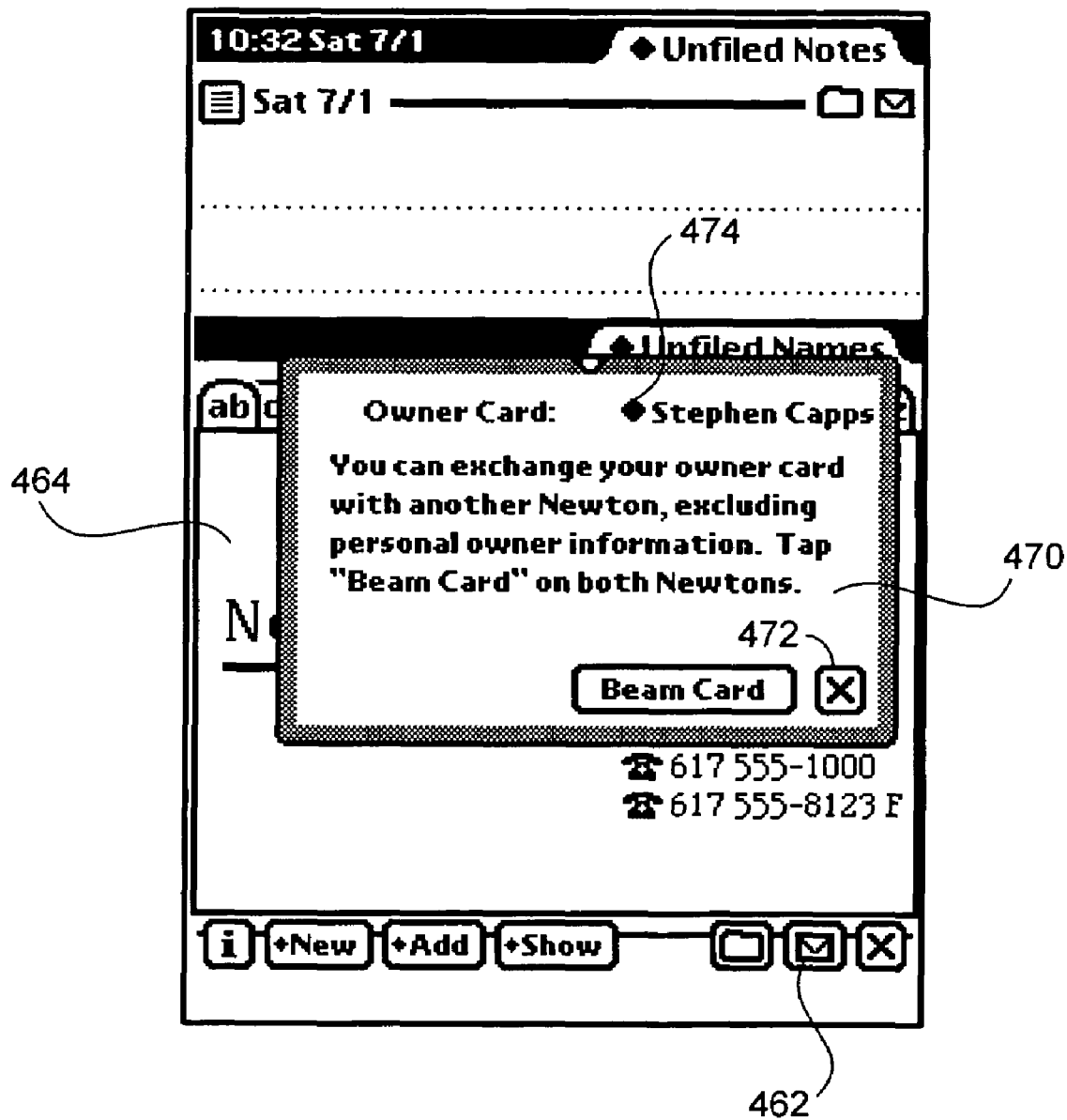
FIG. 19a is a screen shot showing a confirmation dialog box that would appear upon a user selecting a "Beam My Card" action from the pop-up menu shown in FIG. 18.
Figure 19B:
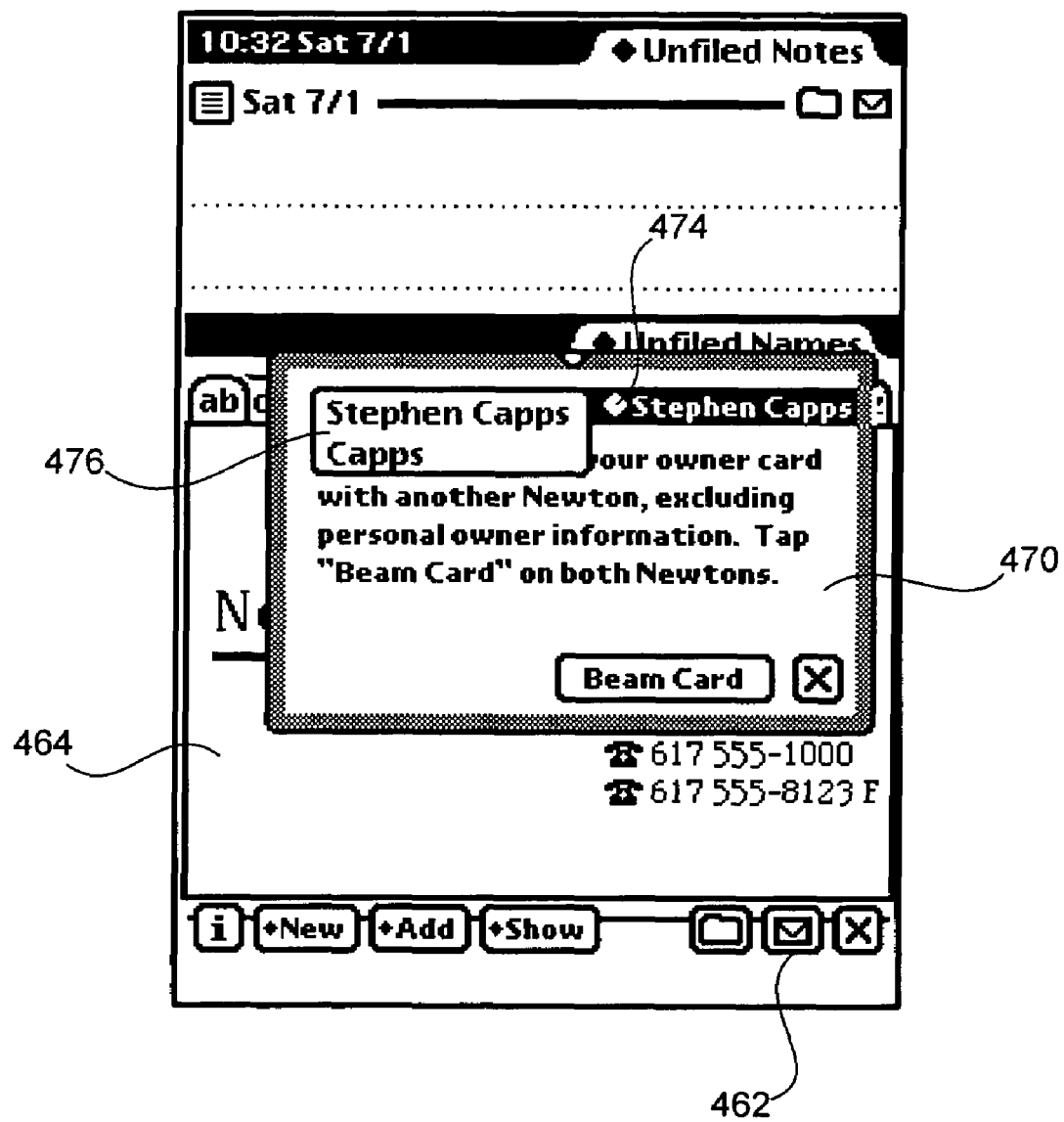
FIG. 19b is a screen showing a confirmation dialog box as in FIG. 19a but displaying a pop-up menu for changing personas.

The process of FIG. 17 can be further understood in terms in various screen shots representing a preferred user interface for implementing this process. As shown in FIG. 18, the "names" application referenced in step 442 is shown with an open record 464. Also displayed associated with the "names" application is a transaction button 462 (which is referenced in decision step 442). When the user taps on the transaction button, a menu 466 showing currently available transactions is displayed as noted at step 446 of FIG. 17. Within the list of available transactions is a "Beam My Card" transaction indicated at 468. If the user taps the "Beam My Card" button a beam card routing slip 470 is displayed as shown in FIG. 19*a*. This is an example of the confirmation dialog reference in process step 456 of FIG. 17. As shown, the confirmation slip includes two control buttons 472: a beam card button (for executing the transaction) and a close button (for closing the dialog box). In addition, the confirmation slip 470 includes a persona button 474 with the computer system's current persona displayed beside it. By tapping this button, a user accesses a list of available personas as indicted in steps 306 and 314 of FIG. 11. FIG. 19*b* provides a screen shot of the display after the user has, in fact, tapped on persona button 474. As shown, this causes a menu 476 of available personas to be displayed beside the persona button 474.

CONCLUSION

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. In particular, the described frame database system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A method implemented on an electronic device having a display screen, the method comprising the following steps:
   identifying a transaction specified by a user via a graphical user interface of the electronic device, the transaction requiring, in order to be performed, that values of a collection of parameters be specified;
   determining a current persona for said electronic device, said persona being one of multiple personas available on the electronic device and for use by one or more users of the electronic device, each of said personas having an associated set of values for persona parameters, at least some of the persona parameters being within said collection of parameters required to perform said transaction; and
   performing the specified transaction with the persona parameters for the current persona.

2. The method of claim 1 wherein said determining a current persona includes determining whether the user of the electronic device has selected a persona from a displayed representation of the multiple personas available on the electronic device.

3. The method of claim 1 wherein the electronic device is a computing device.

4. A computer capable of adopting multiple personas, the computer comprising:
   a CPU;
   a memory in communication with said CPU;
   a display screen in communication with said CPU;
   encoded instructions stored in said memory for specifying two or more personas corresponding to capabilities for operating the computer for use by a user, each of said personas specifying a unique set of persona parameters; and
   encoded instructions stored in said memory for switching between said two or more personas, wherein when said computer is associated with a current persona, transactions performed with the computer employ the set of persona parameters associated with that current persona.

5. The computer of claim 4 further comprising encoded instructions stored in the memory for displaying on said display screen a visual indication of the two or more personas on said display screen.

6. The computer of claim 5 further comprising encoded instructions stored in said memory for causing said computer to adopt a persona which is selected from the two or more personas.

7. The computer of claim 4 further comprising encoded instructions stored in the memory for specifying a current persona associated with a password entered by the user.

8. The computer of claim 4 wherein the computer is a hand-held computer.

9. A computer readable medium containing program instructions executable by a processor for:
- identifying a task specified by a user via a graphical user interface of an electronic device, said task requiring, in order to be performed, that values of a collection of parameters be specified;
- determining a current persona for said electronic device, said persona being one of multiple personas available on the electronic device and for use by one or more users of the electronic device, each of said personas having an associated set of values for persona parameters, at least some of the persona parameters being within said collection of parameters required to perform said task; and
- performing the specified task with the persona parameters for the current persona.

10. The computer readable medium of claim 9 wherein the program instructions for determining a current persona include instructions for determining whether the user of the electronic device has selected a persona from a displayed representation of the multiple personas available on the electronic device.

11. A computer readable medium containing program instructions executable by a processor for:
- identifying a collection of parameters required to operate a computing device;
- determining a current persona from a plurality of personas for the computing device, said persona being one of multiple personas available on the computing device and for use by one or more users of the computing device, each of said personas having an associated set of values for persona parameters, at least some of the persona parameters being within said collection of parameters required to operate said computing device; and
- thereafter operating the computing device in accordance with the current persona.

12. A computer readable medium of claim 11 wherein each of said personas pertain to a capacity of operation for the computing device.

13. A computer readable medium of claim 11 wherein each of said personas pertain to a task capable of being performed by the computing device.

14. A computer readable medium of claim 11 wherein each of said personas are associated with a different graphical user interface provided by the computing device.

15. A computer readable medium of claim 11 wherein said computer readable medium further comprises program instructions for:
- displaying a graphical user interface that facilitates switching between said personas.

16. A computer readable medium of claim 11 wherein said computer readable medium further comprises program instructions for:
- displaying a visual indication of the current persona on a display screen of the computing device.

17. A computer readable medium of claim 11 wherein the computing device is a hand-held computer.

18. A computer readable medium of claim 11 wherein the computing device is a portable computing device.

19. A computer readable medium of claim 11 wherein the computing device is a computer system.

* * * * *

UNITED STATES PATENT AND TRADEMARK OFFICE
CERTIFICATE OF CORRECTION

PATENT NO.        : 7,437,677 B1
APPLICATION NO.   : 11/394891
DATED             : October 14, 2008
INVENTOR(S)       : Capps et al.

Page 1 of 1

It is certified that error appears in the above-identified patent and that said Letters Patent is hereby corrected as shown below:

On the Title Page, Item (73) Assignee:   Change "Apple, Inc." to --Apple Inc.--

Signed and Sealed this

Thirteenth Day of January, 2009

JON W. DUDAS
*Director of the United States Patent and Trademark Office*